US012345001B2

(12) United States Patent
Maus et al.

(10) Patent No.: US 12,345,001 B2
(45) Date of Patent: Jul. 1, 2025

(54) CRASH IMPACT ATTENUATOR SYSTEMS AND METHODS

(71) Applicants: TRAFFIX DEVICES, INC., San Clemente, CA (US); NUTECH VENTURES, Lincoln, NE (US)

(72) Inventors: Geoffrey B. Maus, Trabuco Canyon, CA (US); Felipe Almanza, San Clemente, CA (US); Scott Kenneth Rosenbaugh, Lincoln, NE (US); Ronald Keith Faller, Lincoln, NE (US); Robert W. Bielenberg, Lincoln, NE (US); Jennifer Dawn Rasmussen, Lincoln, NE (US); Cody Stolle, Lincoln, NE (US); Karla Ann Lechtenberg, Raymond, NE (US); Brock David Schroder, Lincoln, NE (US); Wyatt Gregory Fallet, Council Bluffs, IA (US)

(73) Assignees: TRAFFIX DEVICES, INC., San Clemente, CA (US); NUTECH VENTURES, Lincoln, NE (US)

( * ) Notice: Subject to any disclaimer, the term of this patent is extended or adjusted under 35 U.S.C. 154(b) by 0 days.

(21) Appl. No.: 18/749,617

(22) Filed: Jun. 21, 2024

(65) Prior Publication Data

US 2025/0059716 A1 Feb. 20, 2025

Related U.S. Application Data

(63) Continuation of application No. 17/346,076, filed on Jun. 11, 2021, now Pat. No. 12,018,444.

(Continued)

(51) Int. Cl.
*E01F 15/04* (2006.01)

(52) U.S. Cl.
CPC .................... *E01F 15/0423* (2013.01)

(58) Field of Classification Search
CPC ....... E01F 15/00; E01F 15/04; E01F 15/0461; E01F 15/146; E01F 15/0423; E01F 15/143
See application file for complete search history.

(56) References Cited

U.S. PATENT DOCUMENTS

| | | | | |
|---|---|---|---|---|
| 1,677,796 | A | * 7/1928 | Parks | ...................... E21D 15/22 248/548 |
| 3,982,734 | A | 9/1976 | Walker | |

(Continued)

FOREIGN PATENT DOCUMENTS

| | | |
|---|---|---|
| CN | 101343863 A | 1/2009 |
| EP | 3040480 A | 7/2016 |

(Continued)

OTHER PUBLICATIONS

"CAT-350 Crash Cushion Attenuating Terminal Assembly Manual", Trinity Highway Products, Feb. 2005.

(Continued)

*Primary Examiner* — Daniel J Wiley
(74) *Attorney, Agent, or Firm* — Stout, Uxa & Buyan, LLP; Donald E. Stout

(57) ABSTRACT

A crash impact attenuator system for deployment in front of a structure includes a rail and a plurality of diaphragms initially disposed in spaced relation along the length of the rail. Each of the plurality of diaphragms moves along the rail, so that when a front end of the crash attenuator system receives an impact force from a vehicle, a first one of the diaphragms moves rearwardly along the rail and impacts a second one of the diaphragms so that both the first and second diaphragms move further rearwardly along the rail, this process continuing with additional ones of the diaphragms until the impact forces have been fully attenuated.

(Continued)

A tearing member on the crash attenuator system engages material forming a side or fender panel of the crash attenuator system, the tearing member tearing material forming the side panel to attenuate the impact force.

19 Claims, 15 Drawing Sheets

Related U.S. Application Data

(60) Provisional application No. 63/125,560, filed on Dec. 15, 2020, provisional application No. 63/080,618, filed on Sep. 18, 2020, provisional application No. 63/041,673, filed on Jun. 19, 2020.

(56) References Cited

U.S. PATENT DOCUMENTS

| | | | |
|---|---|---|---|
| 4,330,106 A * | 5/1982 | Chisholm | E01F 15/0423 256/19 |
| 4,607,824 A * | 8/1986 | Krage | E01F 9/685 256/19 |
| 4,655,434 A * | 4/1987 | Bronstad | E01F 15/143 403/2 |
| 4,784,515 A * | 11/1988 | Krage | E01F 9/638 404/6 |
| 4,815,565 A * | 3/1989 | Sicking | E01F 15/146 404/6 |
| 4,822,208 A | 4/1989 | Ivey | |
| 4,909,661 A | 3/1990 | Ivey | |
| 5,022,782 A * | 6/1991 | Gertz | E01F 15/143 404/6 |
| 5,494,371 A | 2/1996 | Oberth et al. | |
| 5,577,861 A | 11/1996 | Oberth et al. | |
| 5,733,062 A * | 3/1998 | Oberth | E01F 15/146 404/6 |
| 5,797,592 A | 8/1998 | Machado | |
| 5,868,521 A * | 2/1999 | Oberth | E01F 15/146 404/6 |
| 5,947,452 A | 9/1999 | Albritton | |
| 5,957,435 A * | 9/1999 | Bronstad | E01F 15/143 404/6 |
| 6,190,084 B1 | 9/2001 | Banez | |
| 6,293,727 B1 * | 9/2001 | Albritton | E01F 15/146 404/6 |
| 6,308,809 B1 | 10/2001 | Reid et al. | |
| 6,457,570 B2 | 10/2002 | Reid et al. | |
| 6,461,076 B1 | 10/2002 | Stephens et al. | |
| 6,536,985 B2 | 3/2003 | Albritton | |
| 6,536,986 B1 * | 3/2003 | Anghileri | E01F 15/146 404/6 |
| 6,554,529 B2 | 4/2003 | Stephens et al. | |
| 6,623,204 B2 | 9/2003 | Buehler | |
| 6,811,144 B2 | 11/2004 | Denman et al. | |
| 6,863,467 B2 | 3/2005 | Buehler et al. | |
| 6,905,281 B2 | 6/2005 | Kang | |
| 6,962,459 B2 | 11/2005 | Smith et al. | |
| 7,018,130 B2 | 3/2006 | Smith et al. | |
| 7,037,029 B2 | 5/2006 | Buehler et al. | |
| 7,059,590 B2 * | 6/2006 | Bronstad | E01F 15/083 256/13.1 |
| 7,070,031 B2 | 7/2006 | Smith et al. | |
| 7,086,805 B2 | 8/2006 | Smith et al. | |
| 7,101,111 B2 * | 9/2006 | Albritton | E01F 15/0423 404/6 |
| 7,112,004 B2 | 9/2006 | Alberson et al. | |
| 7,210,874 B2 * | 5/2007 | Albritton | E01F 15/146 404/6 |
| 7,246,791 B2 | 7/2007 | Alberson et al. | |
| 7,306,397 B2 | 12/2007 | Albritton | |
| 7,396,184 B2 | 7/2008 | La Turner et al. | |
| 7,484,906 B2 | 2/2009 | La Turner et al. | |
| 7,530,548 B2 * | 5/2009 | Ochoa | E01F 15/143 404/6 |
| 7,597,501 B2 | 10/2009 | Alberson et al. | |
| 7,758,277 B2 | 7/2010 | La Turner et al. | |
| 7,794,174 B2 | 9/2010 | McKenney et al. | |
| RE41,988 E | 12/2010 | Oberth et al. | |
| 7,871,220 B2 | 1/2011 | Albritton | |
| 8,215,619 B2 * | 7/2012 | Leonhardt | E01F 15/025 256/13.1 |
| RE43,927 E | 1/2013 | Buehler | |
| 8,414,216 B2 | 4/2013 | Albritton | |
| 8,469,626 B2 | 6/2013 | Thompson et al. | |
| 8,596,903 B2 * | 12/2013 | Hur | E01F 15/146 404/6 |
| 8,714,866 B2 | 5/2014 | Albritton | |
| 8,974,142 B2 | 3/2015 | Buehler et al. | |
| 9,051,698 B1 | 6/2015 | Anghileri et al. | |
| 9,200,417 B2 * | 12/2015 | Leonhardt | E01F 15/0423 |
| 9,611,599 B1 | 4/2017 | Dyke et al. | |
| 9,611,601 B1 | 4/2017 | Anghileri et al. | |
| 9,725,857 B2 | 8/2017 | Cho | |
| 9,790,653 B2 * | 10/2017 | Thompson | E01F 15/146 |
| 11,453,988 B2 * | 9/2022 | Lim | E01F 15/0438 |
| 2003/0057410 A1 * | 3/2003 | Denman | E01F 15/146 256/13.1 |
| 2003/0210954 A1 * | 11/2003 | Kang | E01F 15/146 404/6 |
| 2005/0191125 A1 | 9/2005 | Albritton | |
| 2006/0011900 A1 * | 1/2006 | Ochoa | E01F 15/0438 256/13.1 |
| 2006/0054876 A1 * | 3/2006 | LaTurner | E01F 15/146 404/6 |
| 2006/0193688 A1 * | 8/2006 | Albritton | E01F 15/146 404/6 |
| 2008/0181722 A1 | 7/2008 | McKenney et al. | |
| 2011/0091273 A1 * | 4/2011 | Sayre | C08G 18/3215 404/6 |
| 2012/0104337 A1 | 5/2012 | Hur | |
| 2016/0369460 A1 | 12/2016 | Cho | |
| 2021/0108383 A1 * | 4/2021 | Maus | E01F 15/0423 |
| 2021/0277615 A1 | 9/2021 | Sindorf et al. | |
| 2021/0381181 A1 | 12/2021 | Thompson et al. | |

FOREIGN PATENT DOCUMENTS

| | | |
|---|---|---|
| EP | 3040480 A1 | 7/2016 |
| IT | MI20101684 A1 | 3/2012 |
| JP | 2008222035 A | 9/2008 |
| JP | 2016539266 A | 12/2016 |
| KR | 100405957 B1 | 11/2003 |
| KR | 100707914 B1 | 4/2007 |
| KR | 101273410 B1 | 6/2013 |
| KR | 101287856 B1 | 7/2013 |
| KR | 1020150098393 A | 8/2015 |
| KR | 1020170099630 A | 9/2017 |
| KR | 1020180025019 A | 3/2018 |
| KR | 101847463 A | 4/2018 |
| KR | 101879200 B1 | 7/2018 |
| WO | 2018043867 A1 | 5/2017 |

OTHER PUBLICATIONS

International Search Report and Written Opinion issued in connection with corresponding International App. No. PCT/US2021/037116 dated Oct. 6, 2021.
Office Action issued on Oct. 31, 2024 in connection with corresponding South Korean App. No. 10-2023-7000727.
Office Action issued on Nov. 14, 2023 in connection with corresponding Japanese App. No. 2022-569177.
Supplementary European Search Report issued on Jul. 12, 2024 in connection with corresponding European App. No. 21827081.7.
Office Action issued on May 9, 2024 in connection with corresponding Chinese App. No. 2021806770X.

* cited by examiner

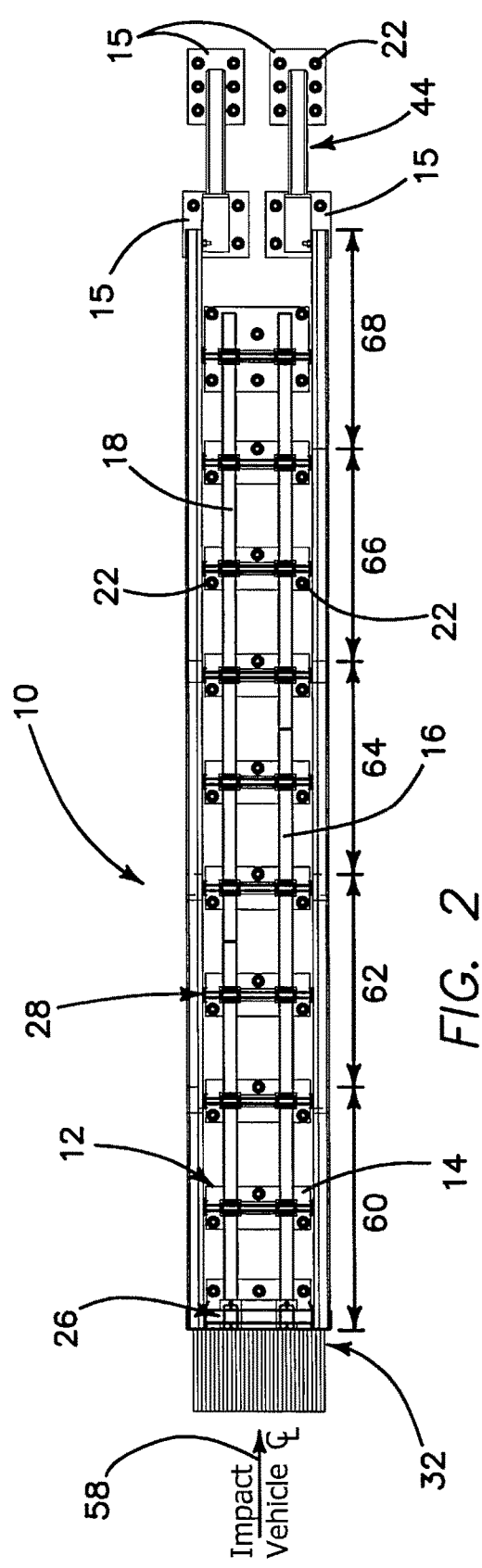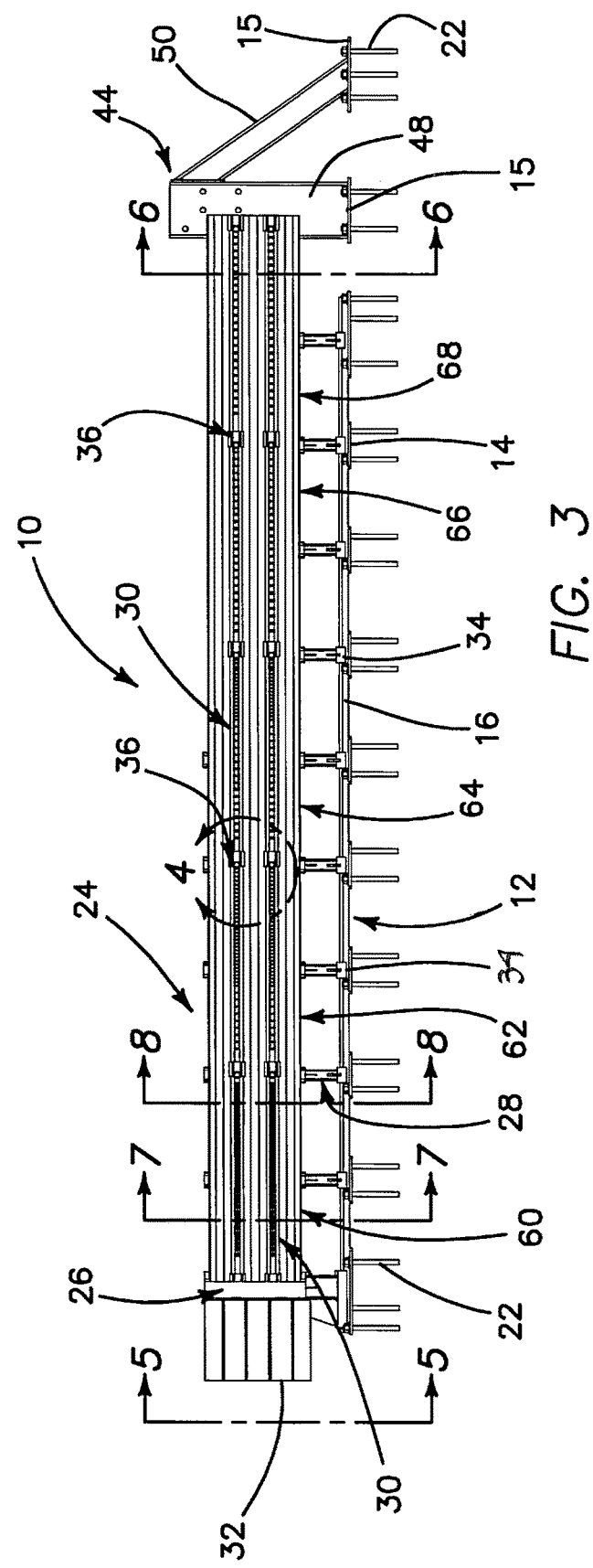

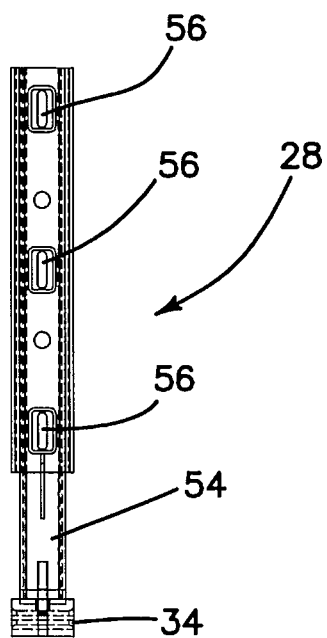 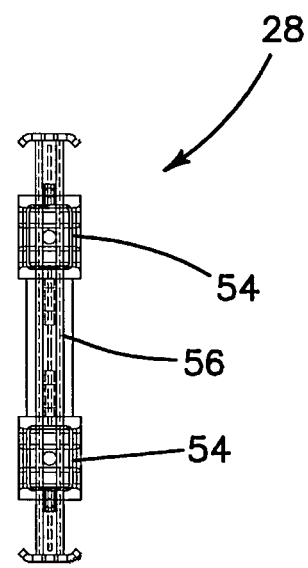
FIG. 12  FIG. 13
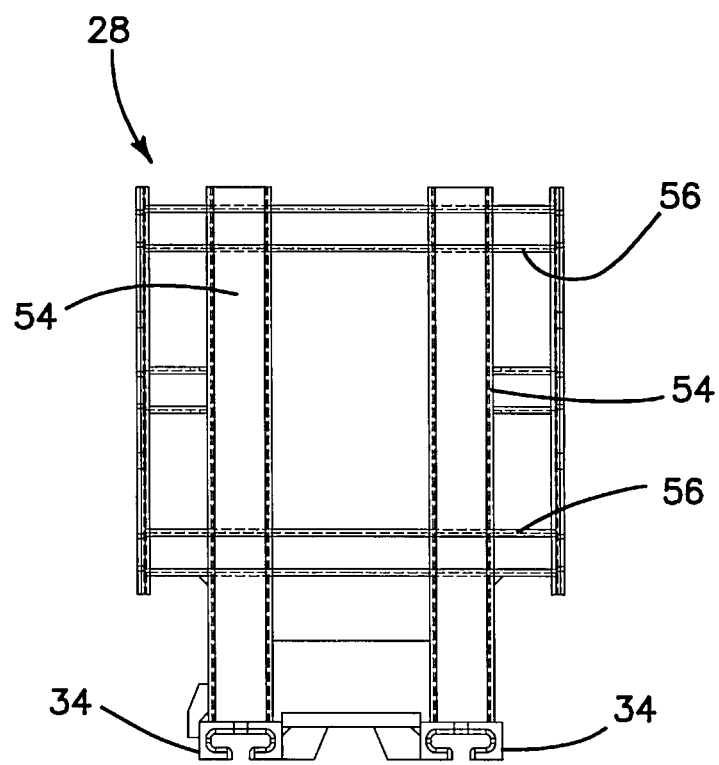
FIG. 14

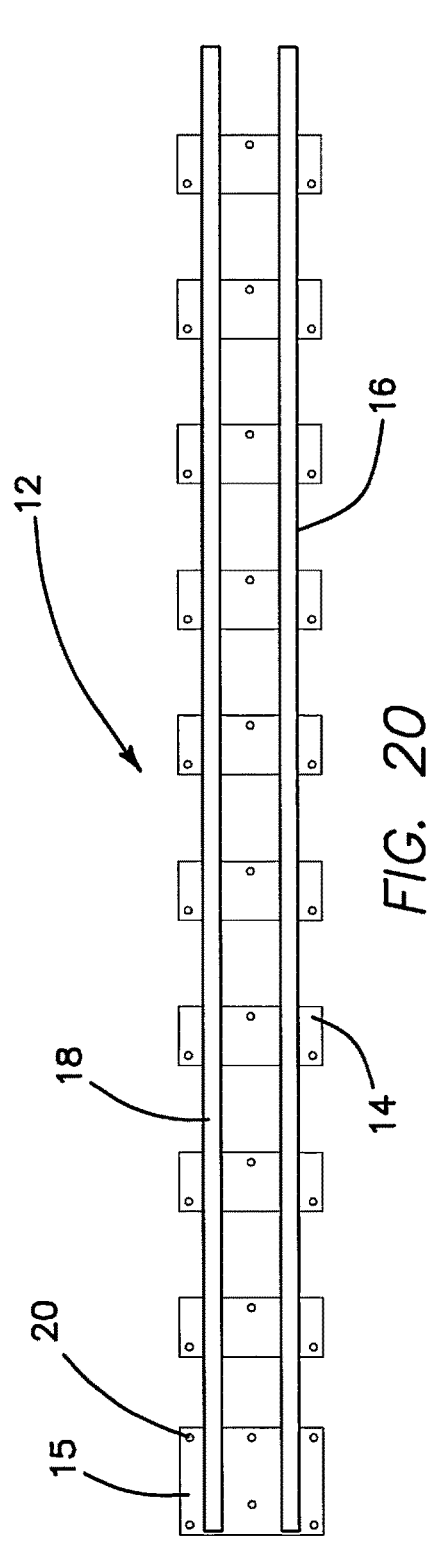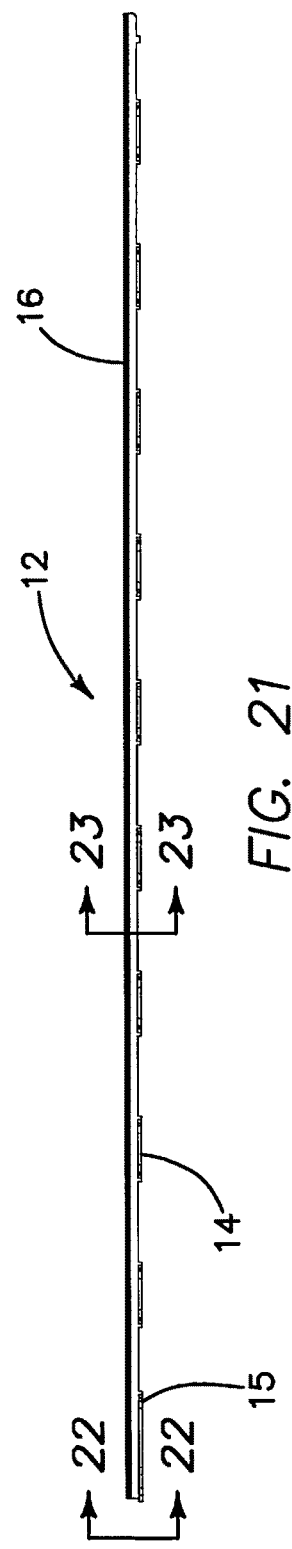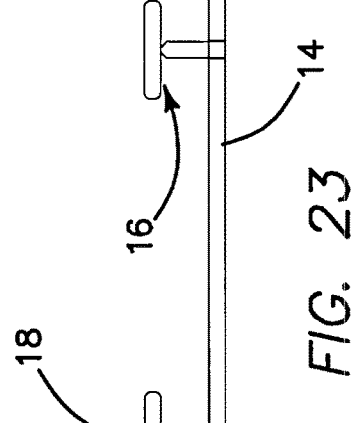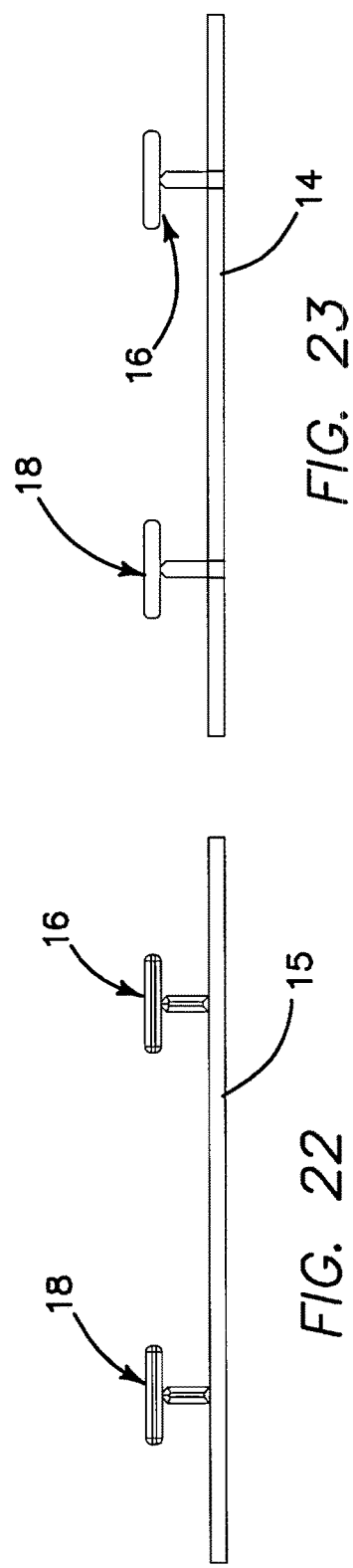

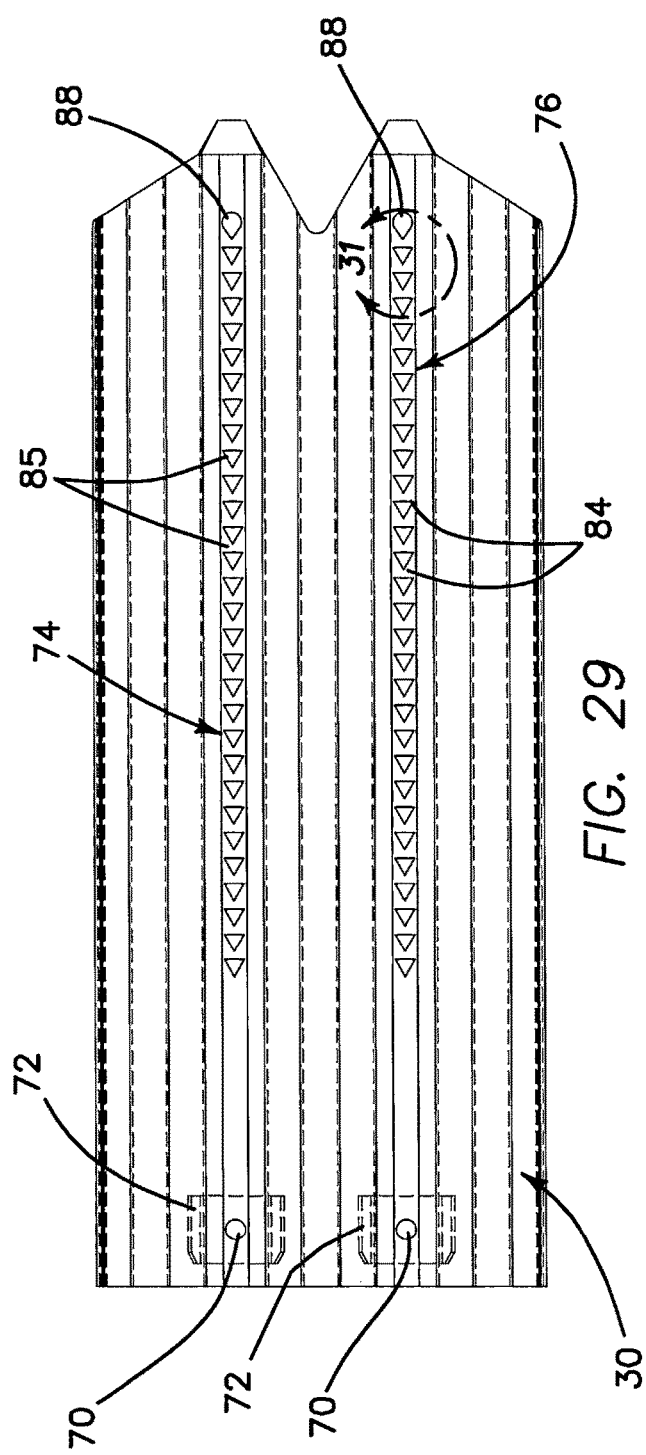
FIG. 29
FIG. 30
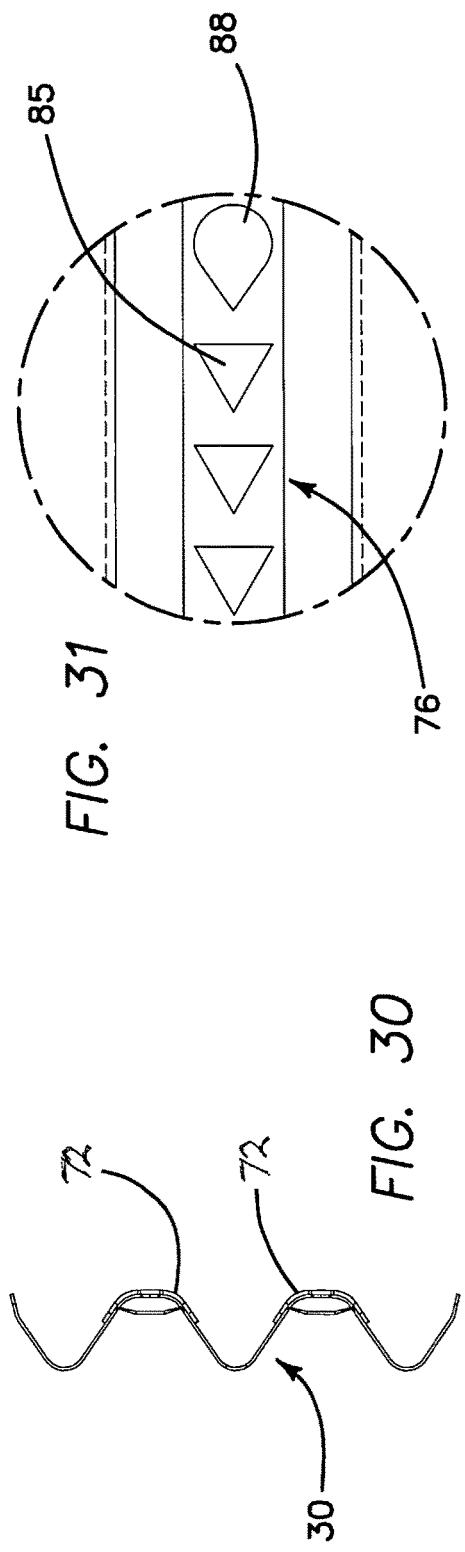
FIG. 31

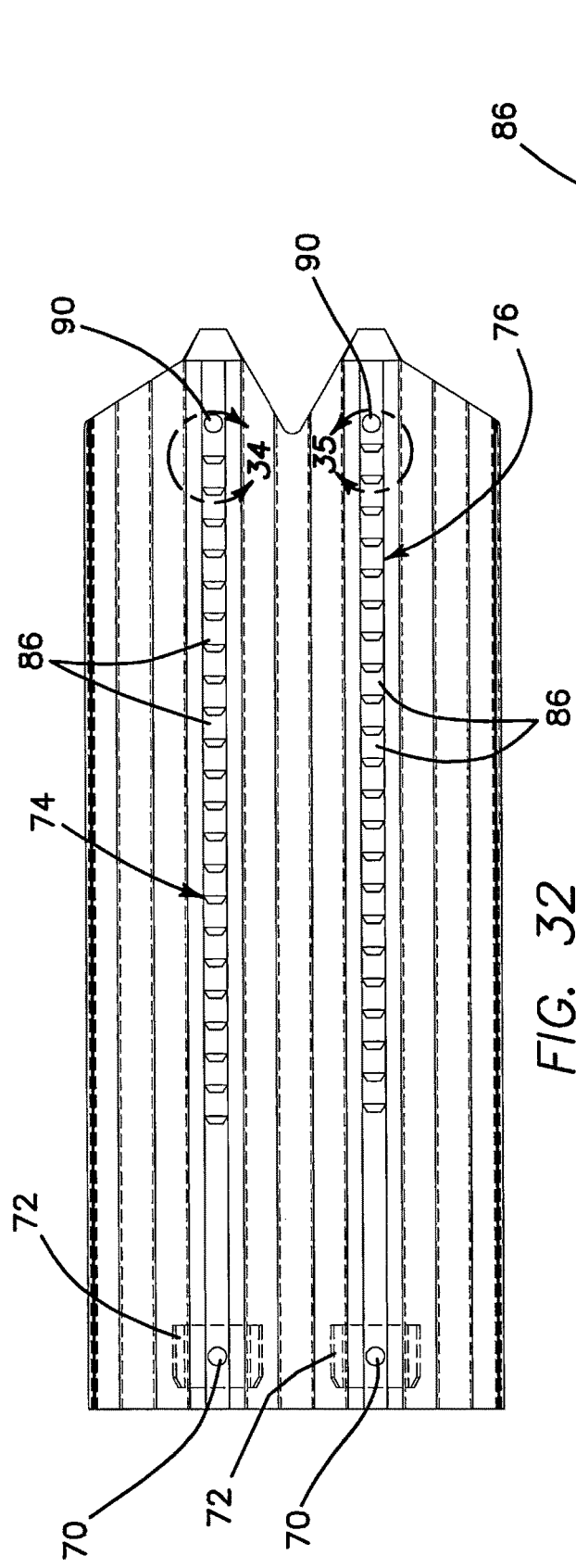
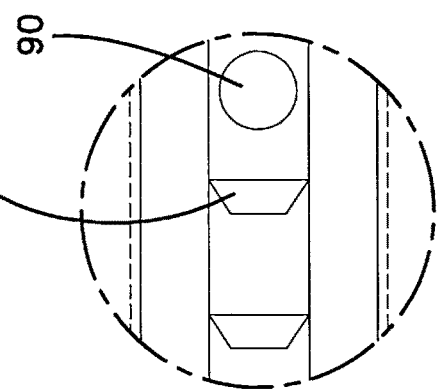
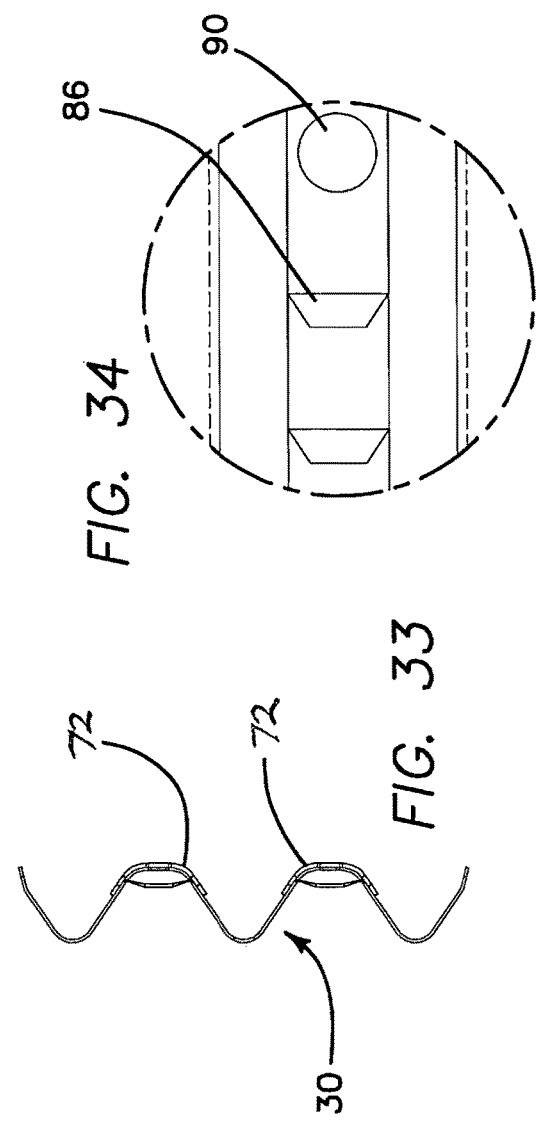

CRASH IMPACT ATTENUATOR SYSTEMS AND METHODS

This application is a continuation under 35 U.S.C. 120 of U.S. application Ser. No. 17/346,076, entitled Crash Impact Attenuator Systems and Methods, filed on Jun. 11, 2021 and issuing on Jun. 25, 2024 as U.S. Pat. No. 12,018,444, which in turn claims the benefit under 35 U.S.C. 119 (e) of the filing date of U.S. Provisional Application Ser. No. 63/041,673, entitled Crash Impact Attenuator Systems and Methods, filed on Jun. 19, 2020, of U.S. Provisional Application Ser. No. 63/080,618, entitled Crash Impact Attenuator Systems and Methods, filed on Sep. 18, 2020, and of U.S. Provisional Application Ser. No. 63/125,560, entitled Crash Impact Attenuator Systems and Methods, and filed on Dec. 15, 2020. All of the foregoing applications are expressly incorporated herein by reference, in their entirety.

The invention described in this application was developed under a Joint Research Agreement, as defined in 35 U.S.C. 102((b)(2)(C), between TrafFix Devices, Inc. (TrafFix) and the Board of Regents of the University of Nebraska-Lincoln (UNL) and its intellectual property and commercialization unit, NuTech Ventures (NuTech).

BACKGROUND OF THE INVENTION

The present invention relates generally to crash impact attenuators, and more particularly to motor vehicle and highway barrier crash impact attenuators comprising fixed systems protecting leading edges of abutments and other fixed roadside hazards.

Vehicular accidents on the highway are a major worldwide problem and are undoubtedly one of the largest causes of economic and human loss and suffering inflicted on the developed world today. In an effort to alleviate, in particular, the human toll of these tragic accidents, guardrails, crash cushions, truck-mounted crash attenuators, crash barrels, and the like have been developed to attenuate the impact of the vehicle with a rigid immovable obstacle, such as a bridge abutment.

A crash attenuator of the type described must absorb the vehicle impact energy without exceeding limits on the vehicle deceleration. In addition, it must accommodate both heavy and light weight vehicles. The lightest vehicle will set the limit on the maximum force produced by the attenuator and the heavy vehicle—which will experience a lower deceleration, and thus will determine the total impact deformation required. When impacted head-on, crash attenuators/cushions are designed to absorb energy and to gradually slow the vehicle to a controlled stop. The force cannot exceed the light vehicle limit and therefore the initial force and deceleration is low, limiting the energy absorption. Increasing crash resistance as the vehicle "rides down" from its impact speed to zero is a vitally important feature of a crash attenuator system which meets rigid governmental safety standards. When impacted obliquely on its side, a crash cushion is designed to redirect the vehicle back toward the roadway and to prevent severe impact with the rigid point hazard. Typical crash cushions incorporate side rails/panels, intermediate diaphragms, a track assembly to anchor and guide the intermediate diaphragms, and energy absorbers. As crash safety standards have evolved to higher and higher requirements in order to better protect vehicle occupants from injury, it has become clear that new generation crash impact attenuators, or crash cushions, are required to perform this function and meet these high standards in innovative, inexpensive, and very simple, but effective, manners. The present invention meets and exceeds these high standards.

The invention, together with additional features and advantages thereof, may best be understood by reference to the following description taken in conjunction with the accompanying illustrative drawing.

SUMMARY OF THE INVENTION

The present invention is particularly innovative, in that the side panels disposed thereon also serve as the energy absorbers, so that there is no need for additional interior absorber components. This approach, which reduces system complexity and cost, has not been utilized in previous crash cushion technology.

The side panels of the new crash impact attenuator system are designed to slide over or telescope over each other as the crash attenuator system is compressed end-on. This is a common feature of crash cushions. However, the attachment bolts at the downstream end of each panel are intended to tear through the side panels/rails as the panel moves past the attachment bolt. This tearing behavior absorbs energy as the system is compressed and the errant vehicle is brought to a controlled, safe stop prior to impacting the rigid hazard. The resistance forces in the panels are controlled to absorb energy at a prescribed rate as the attenuator compresses. The resistance forces are designed to be low initially, but to increase along the overall length of the system. Forces can differ between panels and even within individual panel segments. Variations in the resistance force are achieved through several novel concepts, such as varying panel thicknesses and the introduction of holes configured with various shapes that are cut into the panels along the tearing path. Utilization of different shapes and spacings between shapes not only affects the resistance forces, but also helps to control the consistency of the tear path and can be used to achieve different fracture modes (e.g. Mode I—tensile failure, Mode II—shear failure, Mode III—out-of-plane shear, or a combination of these failure mechanisms). Further, some hole shapes can be used to reduce debris. Perforations may also be used to control resistance forces and tearing path. For panels with higher resistances, the holes or cutouts can be staggered to mitigate force spikes during the impact event. Subsequently, panels can be configured for multiple forces and for multiple impact conditions.

The structure of an exemplary embodiment of the crash cushion is configured with a dual track design having two T-shaped track-rails, which anchor and guide the intermediate diaphragms. The track rails are welded to intermittent base plates that are anchored to the pavement. The intermediate diaphragms and impact head are assembled from structural steel tubes and equipped with feet that slide along the guide track. The feet on the impact head are elongated to prevent/limit rotations of the impact head about the vertical and lateral axes during off-centered/angle impacts and high bumper impacts on the nose of the device, respectively. The intermediate diaphragm feet are also designed to limit rotations. Both the impact head and the intermediate diaphragms are designed with sufficient lateral strength capacity to withstand vehicle impacts to the side of the crash cushion. Attachment bolts between the panels and the intermediate diaphragms/impact head are configured with a specially designed, integrated washer plate to allow the panels to slide over each other, guide the tearing path along the panels, and prevent the attachment bolts from pulling through the side panels. Also, the crash cushion is equipped with a crushable energy absorbing nose piece that prolongs momentum transfer and elongates the inertial pulse as the impact head and side panels begin to move at the start of an impact event. This feature reduces peak forces imparted to the vehicle and its occupants.

More particularly, in one aspect of the invention there is provided a crash impact attenuator system for mitigating a direct vehicular impact with a fixed structure, comprising an attenuator portion comprising a plurality of supporting members. The fixed structure may comprise, for example, concrete abutments, guardrail systems, terminal and guardrail end treatments, and the like. In the case of guardrails, for example, the supporting members may simply be support posts. The attenuator system further includes a side panel comprising one of a plurality of side panels disposed along a side of the attenuator portion, the side panel being adapted to slide rearwardly along the attenuator portion when the crash impact attenuator system is impacted by a vehicle so that the side panel slides over a second adjacent one of the plurality of side panels as it slides rearwardly responsive to a vehicular impact. Each of the plurality of side panels includes a plurality of holes disposed in material comprising that particular side panel, the plurality of holes extending along a length of each of the plurality of side panels and being spaced lengthwise from one another.

Advantageously, a tearing member is disposed on the attenuator portion, which is adapted to engage one of the plurality of holes in the side panel material. Thus, when the crash attenuator is impacted by a vehicle, relative motion occurs between the side panel and the tearing member, thereby tearing a fracture or slit in the material forming the side panel which extends between adjacent ones of the plurality of holes. This tearing of the side panel material attenuates the impact force. The side panel material is tuned to optimize the tearing of the side panel material, the tuning of the side panel material being accomplished by sizing and arranging the plurality of holes in a predetermined manner.

In illustrated embodiments of the invention, the attenuator portion further comprises a rail extending along a length of the crash attenuator system. In such embodiments, the plurality of supporting members may comprise a plurality of diaphragms disposed in spaced relation along the length of the rail, each of the plurality of diaphragms having a base end or foot adapted to be movably engaged with the rail, so that when the crash impact attenuator system receives an impact force from an impacting vehicle, a first one of the plurality of diaphragms moves rearwardly along the rail and impacts a second one of the plurality of diaphragms, wherein both the first and second ones of the plurality of diaphragms move further rearwardly along the rail, this process continuing with additional ones of the plurality of diaphragms until the impact forces have been fully attenuated. In the illustrated embodiments, the side panels are also known as fender panels, as is typically the case for constructing crash cushions of the type shown and described.

In illustrated embodiments, the tearing member comprises a bolt, and is disposed on one of the plurality of diaphragms. The tearing member preferably comprises a plurality of tearing members, for greater attenuating effect.

Another advantageous feature of the present invention is the ability to tune the side panels for optimal attenuation. For example, the holes, in certain embodiments, are not evenly spaced along the length of the side panel. Adjacent ones of the plurality of holes nearer to a first or rear (rightmost, in the illustrated embodiments) end of the side panel may be more closely spaced than adjacent ones of the plurality of holes closer to a second or front (leftmost, in the illustrated embodiments) end of the side panel. The plurality of holes may not be uniform in size, respective to one another. Rearmost ones of the plurality of holes may be larger and more elongated than those of the plurality of holes which are located closer to the front end of the side panel. The material forming the side panel may be thinner toward the rear end of the side panel, and thicker toward the front end of the side panel. In some embodiments, the plurality of holes may be arranged to form first and second rows of holes spaced from one another along a height of the side panel, wherein corresponding ones of the holes forming each of the first and second rows of holes on the side panel are aligned lengthwise with one another. In other multi-row embodiments of this type, corresponding ones of the holes forming each of the first and second rows of holes on the side panel are staggered lengthwise from one another.

In illustrated embodiments, the side panel comprises a first stage attenuator portion and the second side panel comprises a second stage attenuator portion, the first stage attenuator portion being in front of the second stage attenuator portion and the side panel, which is in an earlier stage, being softer than the second side panel, which is in a later stage, rearward of the earlier stage. The side panel is tuned to be softer than the second side panel because of one or more of the following: a) the side panel has a greater number of holes than the second side panel, b) an average size of the holes in the second side panel is smaller than an average size of the holes in the side panel, c) some or all of the holes in the side panel are differently shaped than some or all of the holes in the second side panel, d) spacings between holes in the second side panel are larger than spacings between holes in the side panel, and e) an average thickness of the side panel is less than an average thickness of the second side panel.

By way of example, the plurality of side panels may further comprise third, fourth, and fifth side panels extending lengthwise rearwardly of the second side panel, wherein the third side panel comprises a third stage attenuator portion, the fourth side panel comprises a fourth stage attenuator portion, and the fifth side panel comprises a fifth stage attenuator portion, wherein the third side panel is stiffer than the second side panel, the fourth side panel is stiffer than the third side panel, and the fifth side panel is stiffer than the fourth side panel. Thus, sequentially from the first through the fifth stages, each successive side panel may be adapted and constructed to be stiffer than the prior-stage side panel. It should be noted that, in some embodiments, identical panels may be used for successive stages, so in such a case, each successive side panel is equal to or greater in stiffness/resistance than the previous side panel going in a rearward direction. Of course, a total of five stages is exemplary or illustrative only, as any number of stages may be employed within the parameters of the inventive concept. A nose box is typically disposed at the frontmost end of the crash attenuator, in each of the foregoing embodiments. Definitionally, "soft" means that the panel or material will provide less force resistance or less energy absorption per unit displacement, while a "stiff" panel or material will provide more force resistance or more energy absorption per unit displacement relative to a soft panel.

An advantageous feature of the invention is that the bolt may be assembled together with a bent washer plate. The bent washer plate comprises a flared front wing. The limited front extension of the bent washer plate allows curling of the side panel and prevents buildup as the side panel is being torn by the bolt.

The plurality of holes extending along the length of each of the plurality of side panels, and being spaced lengthwise from one another, may advantageously comprise a row of holes on each of the plurality of side panels, the row of holes extending lengthwise along each of the plurality of side panels terminating before reaching a front end of each of the plurality of side panels. This termination of the row of holes in each of the plurality of side panels facilitates initiation of shearing in a next adjacent one of the plurality of side panels, thereby reducing spikes in attenuation of the impact force as the crash impact attenuator system is compressed.

Another advantageous feature of the invention is that the rail comprises first and second rails disposed in parallel to one another and extending along a length of the attenuator portion, each of the first and second rails having a T-shaped configuration, including a top flange disposed horizontally and extending along a length of each rail. The base end or foot of each of the plurality of diaphragms comprises first and second base ends or feet, the first foot being configured to wrap around the top flange of the first rail and the second foot being configured to wrap around the top flange of the second rail. This permits lateral loads from oblique impacts to the crash attenuator system to be distributed to each of the first and second rails.

In another aspect of the invention, there is provided a crash attenuator system for deployment in front of a fixed structure. The system comprises a base portion comprising a first outer rail extending along a length of the base portion, a second outer rail spaced from the first outer rail and also extending along a length of the base portion, and a plurality of spaced cross-members or brace tubes extending across a width of the base portion and joining the first outer rail to the second outer rail. The system further comprises an upper attenuator portion comprising a plurality of diaphragms initially disposed in spaced relation along the length of the base portion. Each of the plurality of diaphragms has a base end adapted to be movably engaged with each of the first outer rail and the second outer rail, so that when a front end of the upper attenuator portion receives an impact force from an errant vehicle, a first one of the plurality of diaphragms moves rearwardly along the first and second outer rails and impacts a second one of the plurality of diaphragms so that both the first and second ones of the plurality of diaphragms move further rearwardly along the first and second outer rails, this process continuing with additional ones of the plurality of diaphragms until the impact forces have been fully attenuated. A side panel is disposed on the upper attenuator portion, the side panel having a hole disposed therein which is adapted to engage a tearing member disposed on the upper attenuator portion, the tearing member and the side panel being relatively movable when an impact force strikes the crash attenuator system so that the tearing member tears the side panel, thereby increasing attenuation of the impact force.

In still another aspect of the invention, there is provided a method of attenuating a crash impact force imposed by an errant vehicle which would otherwise strike an immovable object. The method comprises steps of receiving an impact force at a front end of a crash impact attenuator having a base portion and an upper attenuator portion, causing one or more members of the upper attenuator portion to move rearwardly along the base portion responsive to the impact force, and causing a tearing member disposed on the crash impact attenuator to tear material comprising a side panel disposed on the crash impact attenuator as the one or more members of the upper attenuator portion move responsive to the impact force, wherein tearing of the side panel material acts to attenuate the impact force.

In certain embodiments, the tearing member is a projection disposed on one of the one or more members of the upper attenuator portion which is initially engaged with a hole formed in the side panel material. There are a plurality of holes in the side panel material, arranged longitudinally in spaced relation, and the tearing step comprises tearing the side panel material between the initially engaged hole and an adjacent one of the plurality of holes, to form a fracture or slit in the side panel. The tearing member may comprise a bolt, as illustrated in the drawings, or may comprise other components, such as a rod, plate, wedge, or the like.

In still another aspect of the invention, there is provided a crash impact attenuator system for mitigating a direct vehicular impact with a structure. The system comprises an attenuator portion comprising a plurality of supporting members, the plurality of supporting members comprising a rail extending along a length of the crash impact attenuator system and a plurality of diaphragms initially disposed in spaced relations along the length of the rail, each of the plurality of diaphragms having a base end or foot adapted to be movably engaged with the rail, so that when the crash impact attenuator system receives an impact force from an impacting vehicle, a first one of the plurality of diaphragms moves rearwardly along the rail and impacts a second one of the plurality of diaphragms, wherein both the first and second ones of the plurality of diaphragms move further rearwardly along the rail, this process continuing with additional ones of the plurality of diaphragms until the impact forces have been fully attenuated. The attenuator portion includes a plurality of side panels disposed along a side of the attenuator portion. The plurality of side panels are adapted to slide rearwardly along the attenuator portion when the crash impact attenuator system is impacted by a vehicle, so that a first one of the plurality of side panels slides over a second one of the plurality of side panels as it the first one of the plurality of side panels slides rearwardly responsive to a vehicular impact. Each of the plurality of side panels includes a plurality of holes disposed in material comprising each of the plurality of side panels, the plurality of holes extending along a length of each of the plurality of side panels and being spaced lengthwise from one another.

A tearing member is disposed on the attenuator portion which is adapted to engage one of the plurality of holes in the material forming the first one of the plurality of side panels, wherein when the crash attenuator system is impacted by a vehicle, relative motion occurs between the first one of the plurality of side panels and the tearing member, thereby tearing a fracture or slit in the material forming the first one of the plurality of side panels which extends between adjacent ones of the plurality of holes. The tearing of the side panel material attenuates the impact force, the side panel material being tuned to optimize the tearing of the side panel material, and the tuning of the side panel material being accomplished by sizing and arranging the plurality of holes in a predetermined manner.

The first one of the plurality of side panels comprises a first stage attenuator portion and the second one of the plurality of side panels comprises a second stage attenuator portion, the first state attenuator portion being in front of the second stage attenuator portion and the first one of the plurality of side panels being softer than the second one of the plurality of side panels, the plurality of holes disposed in the first one of the plurality of side panels being configured to have a first shape, to trigger a Mode I tensile failure, and the plurality of holes disposed in the second one of the plurality of side panels being configured to have a second shape different than the first shape, to trigger a Mode II shearing failure.

In the illustrated embodiments, the plurality of side panels comprise a plurality of fender panels and the tearing member comprises a bolt. The tearing member may be disposed on one of the plurality of diaphragms. In the illustrated embodiments, the tearing member comprises a plurality of tearing members.

In certain embodiments, the plurality of holes are arranged to form first and second rows of holes spaced from one another along a height of the side panel in which they are disposed. In some embodiment, corresponding ones of the holes forming each of the first and second rows of holes on the side panel in which they are disposed are aligned lengthwise with one another, while in other embodiments, corresponding ones of the holes forming each of the first and second rows of holes on the side panel in which they are disposed are staggered lengthwise from one another. In some embodiments, the first shape is a triangle and the second shape is a trapezoid.

For elongated embodiments, the plurality of side panels further comprises third, fourth, and fifth ones of the plurality of side panels extending lengthwise rearwardly of the second one of the plurality of side panels, the third one of the plurality of side panels comprising a third stage attenuator portion, the fourth one of the plurality of side panels comprising a fourth stage attenuator portion, and the fifth one of the plurality of side panels comprising a fifth stage attenuator portion, wherein the third one of the plurality of side panels is stiffer than the second one of the plurality of side panels, the fourth one of the plurality of side panels is stiffer than the third one of the plurality of side panels, and the fifth one of the plurality of side panels is stiffer than or of the same stiffness as the fourth one of the plurality of side panels. Typically, a nose box disposed at the frontmost end of the crash attenuator system.

An advantageous feature of the invention includes the bolt being assembled together with a bent washer plate, which may comprise a flared front wing. The bent washer plate has a limited front extension to allow curling of the one of the plurality of side panels with which the bent washer plate is engaged, and to prevent buildup as the one of the plurality of side panels is being torn by the bolt.

In illustrated embodiments, the plurality of holes extending along the length of each of the plurality of side panels, and being spaced lengthwise from one another, comprise a row of holes on each of the plurality of side panels, the row of holes extending lengthwise along each of the plurality of side panels terminating before reaching a front end of each of the plurality of side panels, wherein termination of the row of holes in each of the plurality of side panels facilitates initiation of tearing in a next adjacent one of the plurality of side panels, thereby reducing spikes in attenuation of the impact force as the crash impact attenuator system is compressed.

As illustrated, the rail comprises first and second rails disposed in parallel to one another and extending along a length of the attenuator portion, each of the first and second rails having a T-shaped configuration, including a top flange disposed horizontally and extending along a length of each rail, wherein the base end or foot of each of the plurality of diaphragms comprises first and second a second base ends or feet, the first foot being configured to wrap around the top flange of the first rail and the second foot being configured to wrap around the top flange of the second rail, so that lateral loads from oblique impacts to the crash impact attenuator system are distributed to each of the first and second rails.

In another aspect of the invention, there is disclosed a method of attenuating a crash impact force imposed by an errant vehicle which would otherwise strike a dangerous object. The method comprises steps of receiving an impact force at a front end of a crash impact attenuator having a base portion and an upper attenuator portion, and tearing material comprising a first side panel disposed on the crash impact attenuator as the side panel moves responsive to the impact force, wherein tearing of the first side panel material acts to attenuate the impact force and comprises a Mode I tensile failure. A further step comprises tearing material comprising a second side panel which is initially disposed rearwardly of the first side panel, wherein the material comprising the second side panel is sized and arranged to require more tearing force than the material comprising the first side panel, the tearing of the material comprising the second side panel comprising a Mode II shearing failure.

The material tearing steps may be performed by one or more tearing members comprising one or more projections disposed on the upper attenuator portion, wherein one of the one or more tearing members is initially engaged with a hole formed in the material of the side panel being torn.

There are a plurality of holes in the material of each of the first and second side panels, arranged longitudinally in spaced relation, and each of the tearing steps comprise tearing the material in the side panel being torn between the initially engaged hole and an adjacent one of the plurality of holes, to form a fracture or slit in the side panel being torn.

In some embodiments, the material forming the second side panel is thicker than the material forming the first side panel.

In some embodiments, the plurality of holes in the first side panel are more closely spaced together than the plurality of holes in the second side panel.

In some embodiments, the plurality of holes is greater in the first side panel than the plurality of holes in the second side panel.

In some embodiments, at least some of the plurality of holes in the first side panel are larger than any of the plurality of holes in the second side panel.

In some embodiments, at least some of the plurality of holes in the first side panel are differently shaped than any of the plurality of holes in the second side panel.

In some embodiments, the second side panel is formed of a different material than the first side panel.

In some embodiments, the plurality of holes in the first side panel are triangular in shape and the plurality of holes in the second side panel are trapezoidal in shape.

As noted above, simplest embodiments of the invention involve the tearing member being forced through a base material with a continuous cross section and fracturing the base material to dissipate energy. However, a variety of modifications may be made to the base material cross section in order to control the fracture and associated energy dissipation. Various shaped holes may be cut through the base material cross section in the path of the tearing member. These shapes can be used to vary the fracture mode, the number of fracture surfaces, and aid in controlling the propagation of the fracture or crack. For example, a series of triangle-shaped cutouts can be used to develop a single Mode I (tensile) fracture surface in a base material. Alternatively, a series of trapezoidal shaped cutouts can be used to develop combined Mode II and Mode III fracture surfaces in a base material. Having multiple fracture surfaces may create debris from the base material, while creating only a single fracture surface along the path of the tearing member will not create debris. Other potential shapes that may be used include, but are not limited to, squares, diamonds, rectangles, slots, circles, half-circles, crescents, etc.

Longitudinal perforations of the base material may also be used independently or in combination with the shaped holes in the base material. The longitudinal perforations modify the force and energy developed through the base material fracture by removal of a portion of the base material section. Additionally, longitudinal perforations can be used to control the propagation of the fracture surface. Single rows can result in a single failure line, while multiple rows can aid in material removal.

Grooves, scoring, or other stress concentration features in the base material that do not completely penetrate the cross section of the base material may also be used independently or in combination with shaped holes or perforations in the base material. These features provide another mechanism for controlling the forces and energy dissipation of the material fracture and may aid in controlling the propagation of the fracture through the base material.

The longitudinal spacing of the various alterations to the base material cross section may also be used to control the fracture and energy dissipation of the invention. The longitudinal spacing of these alterations can be used to control the fracture mode and raise or lower the force levels and energy dissipation by changing the amount of material fractured by the tearing member.

If multiple tearing members and fracture lines are used in a single section of base material, the patterns produced by a given combination of shaped holes, perforations, grooves, scoring, and longitudinal spacing may be staggered or offset longitudinally, such that the patterns are not synchronized with one another. Staggering the patterns causes intermittent fractures along the tearing path to occur at different times, thereby limiting high magnitude force spikes and providing more consistent force levels.

Multiple of the above alterations to the base material cross section can be used within a single section of base material to generate the desired energy dissipation. Further, the modification patterns may be changed along the length of the base material to alter the rate of energy dissipation and create a staged energy absorber within a single base material section.

Two parameters of the base material can be modified to control energy dissipation. One parameter is that the base material itself can be varied to tune the forces and energy associated with the fracture. For example, the material grade of a steel panel can be selected with a specific yield strength and ductility in order to generate the desired forces and energy dissipation rates during fracture. Additionally, different materials such as plastic, steel, or aluminum could be selected to generate the desired fracture behavior.

A second parameter is that the base material thickness can be modified to control the fracture of the material and the energy dissipation. Thickness of the material may be used to control both the fracture mode and the magnitude of the energy dissipated by the fracture. Multiple material layers could be combined at a given location to change the resistive force and energy dissipation, such as through welding metal layers on top of one another. Further different thickness materials could be placed end-to-end to change the force level and energy dissipation at any location. The energy dissipation mechanism described above was developed for use in the valleys of a series of thrie beam panels. However, the methodology may be applied to a wide variety of components and at various locations within the component's cross section. Additionally, the technology is not limited to crash cushion systems and may be applicable to a variety of energy dissipation systems utilized in roadside hardware and other impact absorbing structures The invention, together with additional features and advantages thereof, may best be understood by reference to the following description taken in conjunction with the accompanying illustrative drawings.

BRIEF DESCRIPTION OF THE DRAWINGS

FIG. 2 is a top plan view of the crash attenuator of FIG. 1;

FIG. 3 is an elevation view of the crash attenuator of FIG. 1;

FIG. 12 is an elevational view of an exemplary embodiment of the intermediate diaphragm assembly of the invention;

FIG. 13 is a top plan view of the intermediate diaphragm assembly shown in FIG. 12;

FIG. 14 is a profile view of the intermediate diaphragm assembly shown in FIGS. 12 and 13;

FIG. 20 is a top plan view, similar to FIG. 18, of an exemplary embodiment of the track assembly of the invention;

FIG. 21 is an elevational view of the track assembly of FIG. 20;

FIG. 22 is a cross-sectional view along lines 22-22 of FIG. 21;

FIG. 23 is a cross-sectional view along lines 23-23 of FIG. 21;

FIG. 29 is an elevational view of an exemplary embodiment of the third stage rail assembly of the present invention;

FIG. 30 is a profile view of the third stage rail assembly shown in FIG. 29;

FIG. 31 is an elevational view of the portion of FIG. 29 denoted by the numeral 31;

FIG. 32 is an elevational view of an exemplary embodiment of the fourth and fifth stage rail assemblies of the present invention;

FIG. 33 is a profile view of the fourth and fifth stage rail assembly shown in FIG. 32;

FIG. 34 is an elevational view of the portion of FIG. 32 denoted by the numeral 34; and FIG. 35 is an elevational view of the portion of FIG. 32 denoted by the numeral 35.

DETAILED DESCRIPTION OF THE INVENTION

Figure 1:
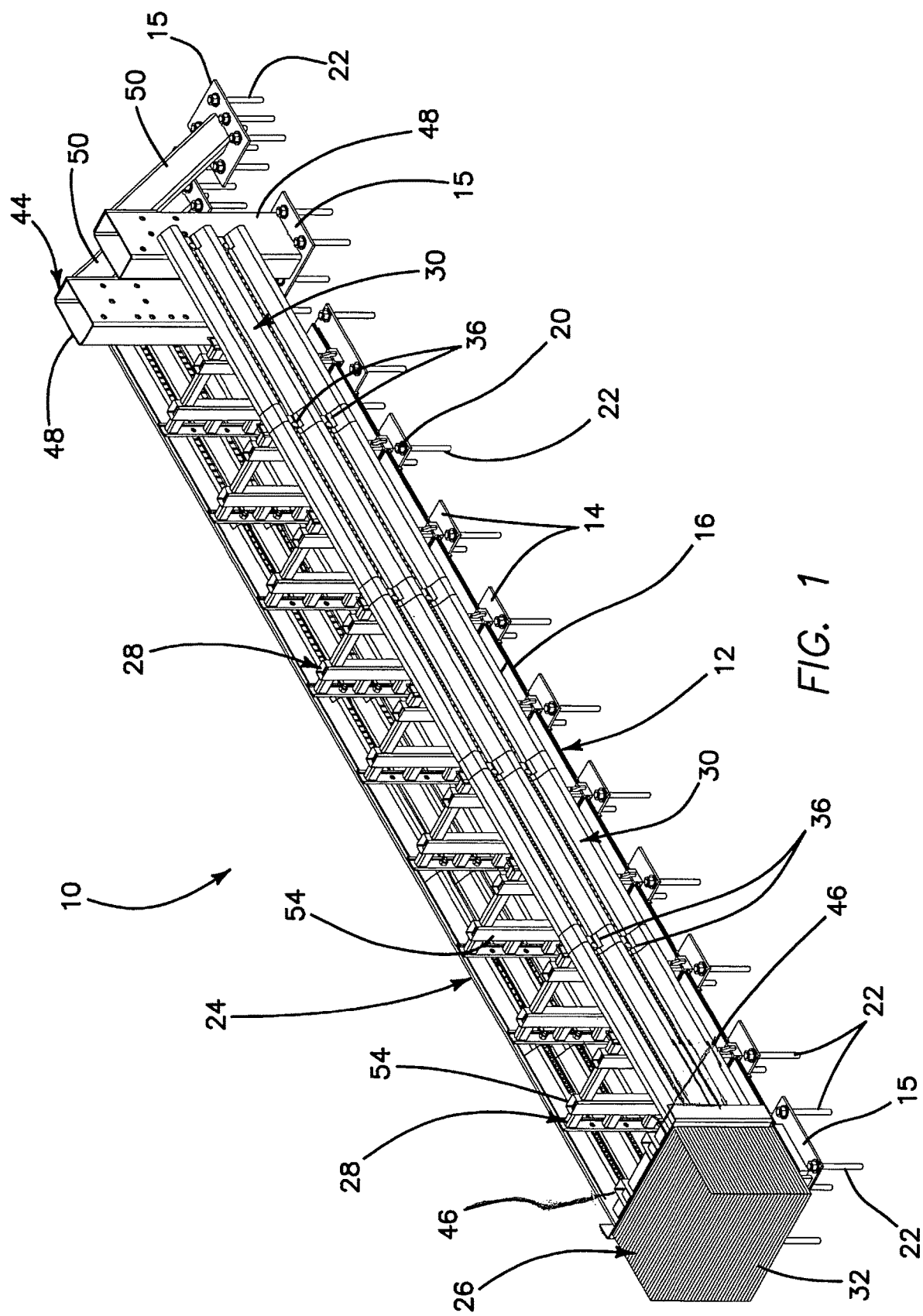
FIG. 1 is an isometric view of an exemplary embodiment of a crash attenuator constructed in accordance with the principles of the present invention, disposed in a deployed orientation.

Referring now more particularly to the drawings, FIGS. 1-3 illustrate an exemplary embodiment of a fixed crash impact attenuator or crash cushion system 10 of the type discussed above, wherein the design is sacrificial, in that after an impact, it is repaired or replaced. Thus, it is designed to be relatively inexpensive and simple in design and construction, yet highly effective in protecting the occupants of vehicles striking the attenuator, either directly or obliquely.

The energy dissipation mechanism of the present invention is a tearing member which is forced through a base material, such that energy dissipation is achieved through fracture of the base material. The inventive system is innovative in part because of its ability to control and vary the force level and energy dissipation of the fracture of the base material through several parameters, including the use of different types of tearing members, alteration of the base material's cross section through various forms of holes, incisions, and stress concentrators, and variation of the base material itself. Modification of these aspects of the energy dissipation mechanism allows for variation in force levels and energy dissipation developed by the material fracture through alteration of the fracture mode, the number of fracture surfaces, and the length of the material fracture. In its simplest form, the energy dissipation may consist of the tearing member being forced through a constant cross-section of base material to form a single fracture line. Alternatively, the introduction of various modifications, such as those listed herein, could produce multiple fracture modes along multiple fracture lines for a more refined energy dissipation.

Design considerations for the system 10 are that it is designed and tested to meet U.S. federal TL (Test Level)-3 crash attenuation specifications, that it is narrow in profile, bi-directionally capable, MASH (Manual for Assessing Safety Hardware) compliant, inexpensive, and free-standing (does not need to butt to rigid object, though it is capable of such an attachment). The system is of a simple design and easy to manufacture (materials are standard sizes and shapes and side panels are standard Thrie Beam-based, such as the AASHTO M-180 profile), easy to assemble, and ships as a complete assembly. The base is the drill template, and anchor holes can be drilled with the unit 10 assembled. The length of the unit as designed, in an exemplary embodiment, is approximately 20-24 feet. Its width is 32 inches or less, which permits the units 10 to be shipped three-wide on a truck. The height may range from 31 to 36 inches in exemplary embodiments. The unit 10 may be anchored to concrete, asphalt, or a hybrid of both, and it may be anchored using standard anchors and adhesives. It is suitable for use in temperatures ranging from below −40 degrees to 150+ degrees F.

The system 10 comprises a base portion or track assembly 12 having a ladder frame design, as particularly shown in FIG. 2, comprising a plurality of intermediate base plates 14 supporting first and second outer rails 16 and 18, respectively, with a larger terminal base plate 15 at each end. The intermediate base plates 14 and terminal base plates 15 each include anchor holes 20 for anchoring the base to the ground using bolt anchors 22 or other suitable mechanical fasteners. In some instances, adhesive may be used instead or as well. The anchor holes 20, in the illustrated embodiment, may be spaced along a length of each base plate 14, 15, both outside of and within the first and second outer rails 16, 18.

Figure 9:
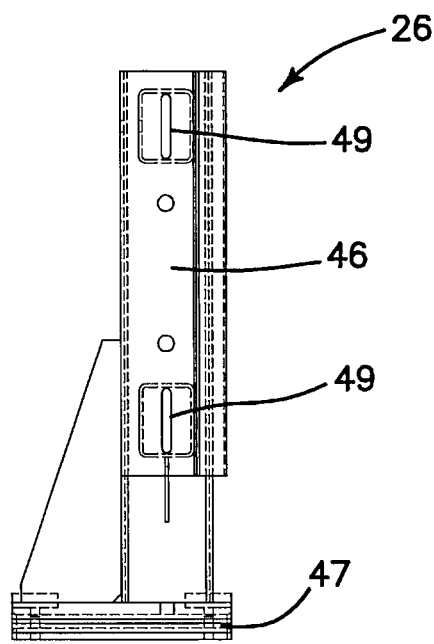
FIG. 9 is an elevational view of an exemplary embodiment of the impact head assembly of the invention.
Figure 10:
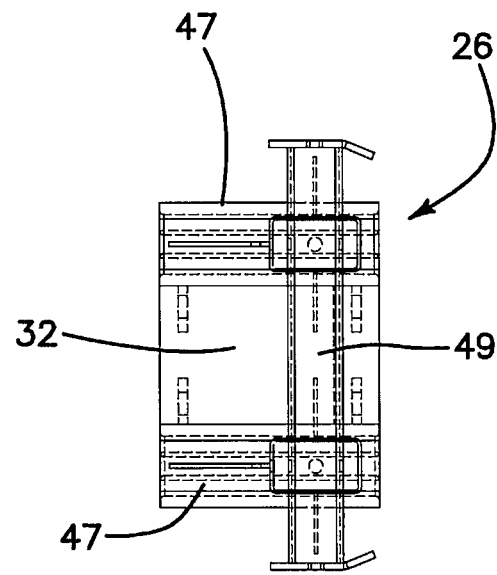
FIG. 10 is a top plan view of the impact head assembly of FIG. 9.
Figure 11:
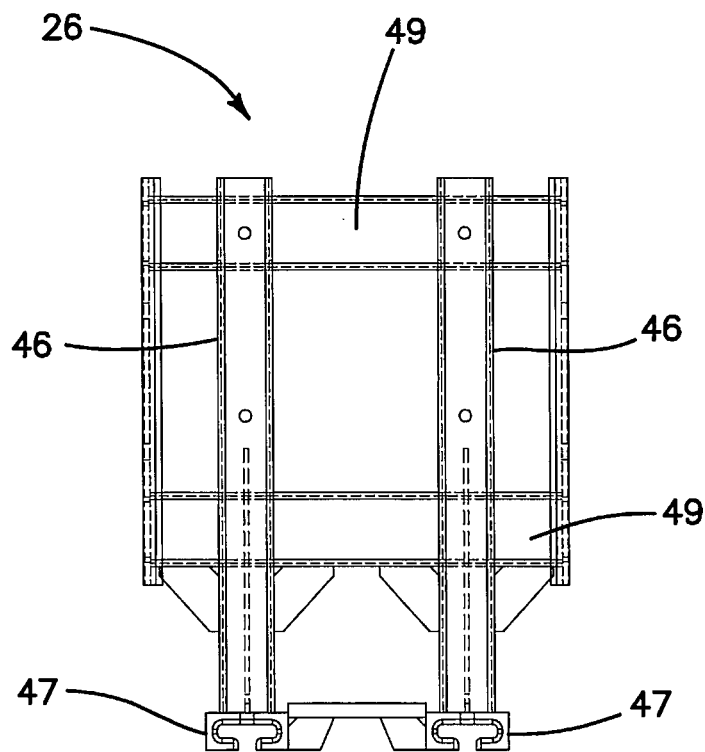
FIG. 11 is a profile view of the impact head assembly of FIGS. 9 and 10.
Figure 15:
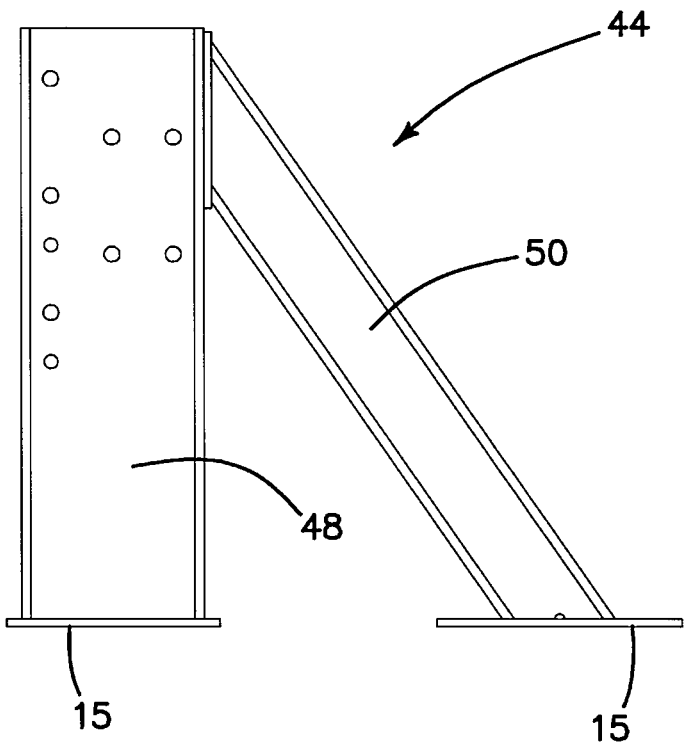
FIG. 15 is an elevational view of an exemplary embodiment of the backup structure assembly of the invention.
Figure 17:
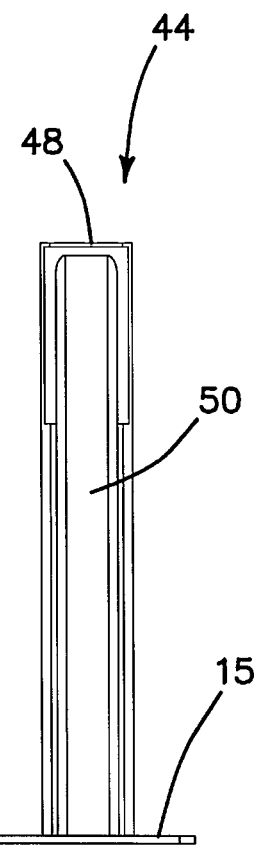
FIG. 17 is a profile view of the backup structure assembly shown in FIGS. 15 and 16.
Figure 16:
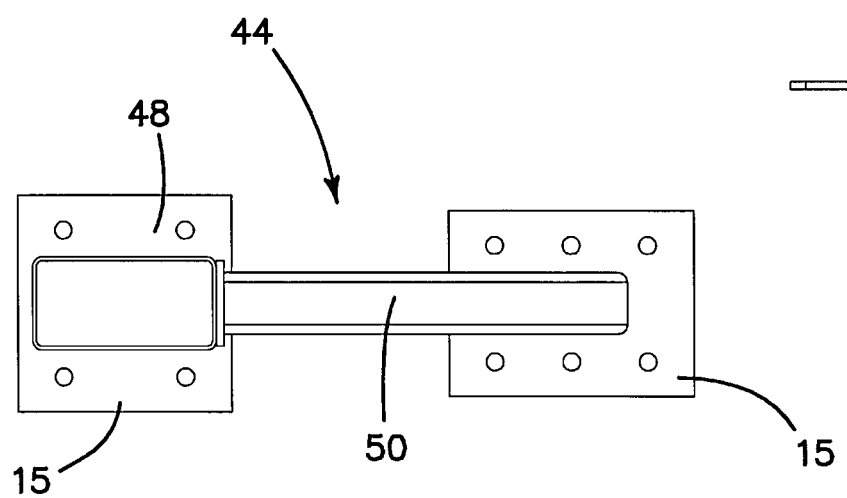
FIG. 16 is a top plan view of the backup structure assembly shown in FIG. 15.
Figure 18B:
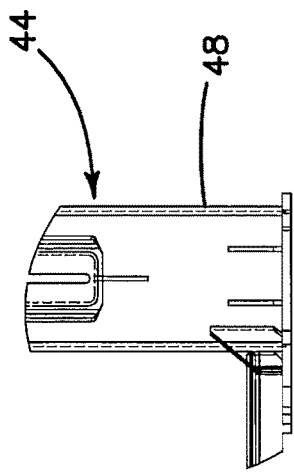
FIG. 18B is an elevational view of the inset area 18B shown in FIG. 19.
Figure 18A:
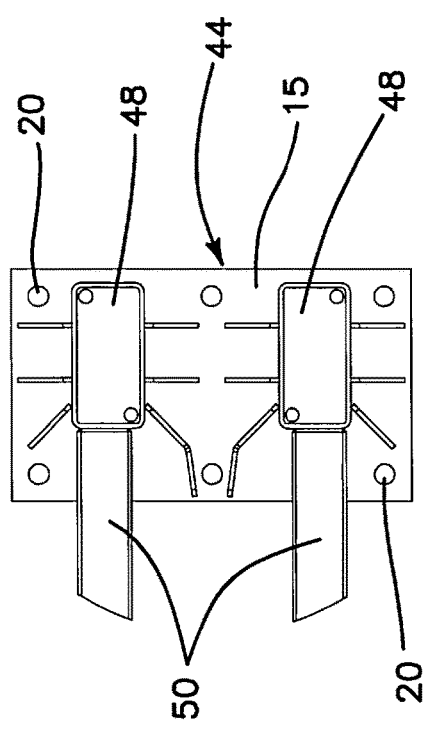
FIG. 18A is a top plan view of the inset area 18A shown in FIG. 18.
Figure 19:
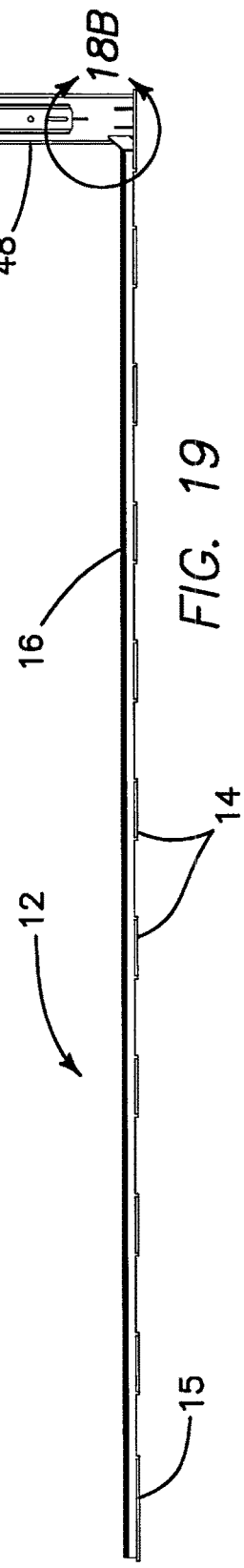
FIG. 19 is an elevational view of the track assembly of FIG. 18.
Figure 18:
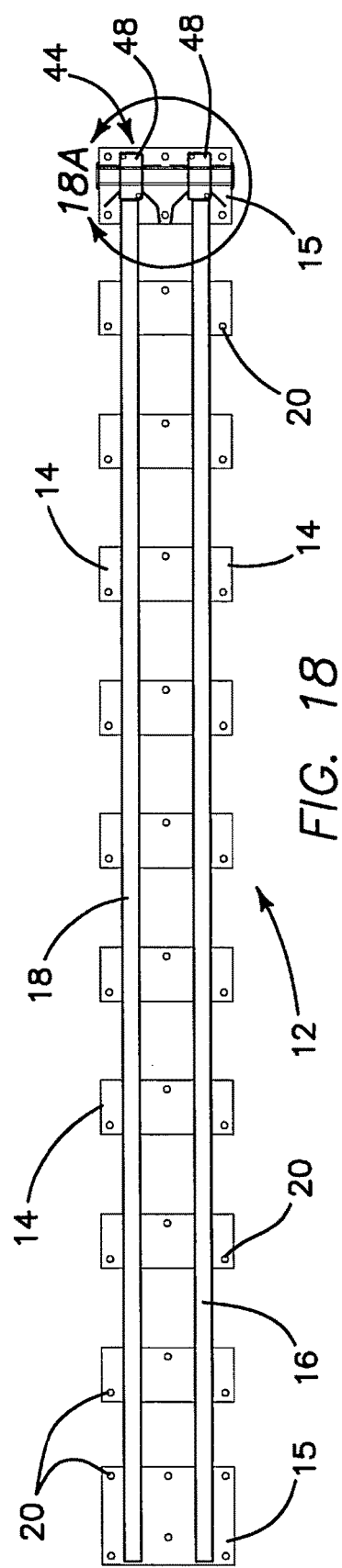
FIG. 18 is a top plan view of an exemplary embodiment of the track assembly of the invention.

The system 10 further includes an upper attenuator portion 24, which comprises an impact head assembly 26, a plurality of intermediate diaphragms 28, comprising an intermediate diaphragm assembly extending between the impact head assembly and the backup structure assembly, and a plurality of side panels 30. The impact head assembly 26 may comprise an object marker on its front end, which may comprise warning striping or the like, and includes a crushable nose box or energy absorber 32 in an exemplary illustrated embodiment. In the illustrated embodiment, the crushable box 32 is filled with a honeycomb material, which is particularly adapted to be crushed and compacted to attenuate impacting forces (the honeycomb is not shown, for the purpose of clarity, in FIGS. 9-11). Of course, suitable attenuating material other than honeycomb may be utilized, if desired. The impact head 26 supports loads applied by frontal, side, and angled nose impacts.

Figure 8:
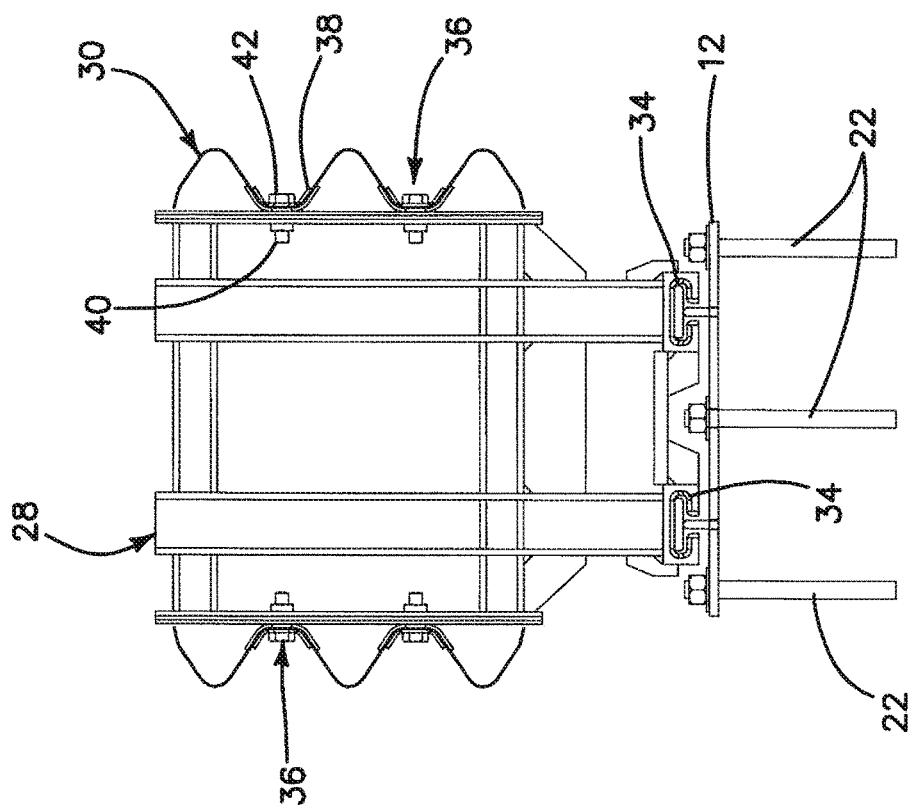
FIG. 8 is a cross-sectional view along lines 8-8 of FIG. 3.
Figure 7:
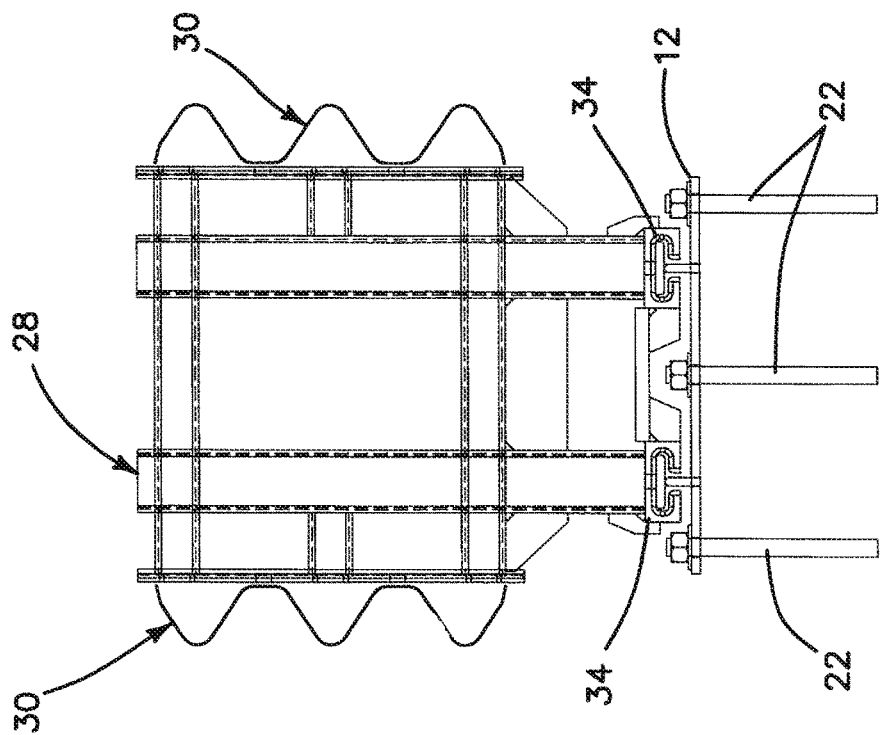
FIG. 7 is a cross-sectional view along lines 7-7 of FIG. 3.

The intermediate diaphragms 28 are disposed in spaced relation behind the impact head 26. They are made from standard shapes and sizes and have cross braces or brace tubes sized for loads. Each cross brace is positioned for ease of assembly of the side panels 30. Each intermediate diaphragm 28 is slidably mounted at their base ends or feet 34 on each side to the side rails 16, 18, as illustrated. The rails 16, 18 are T-shaped, and the feet 34 on the diaphragms 28 are of a "T-slot" configuration, so that they completely envelop and wrap around the upper flange portion of the "T" on the T-shaped rails. This is best shown in FIGS. 7 and 8, for example. As can be seen from those illustrations, this unique configuration permits lateral loads from oblique impacts to be distributed to both rails 16, 18, whereas prior art crash cushions, typically using "C-shaped" rails, only permit lateral loading on the proximate track rail.

The side panels 30 may be standard in construction, and in the case of a crash cushion of the type illustrated, may comprise a corrugated beam, such as a standard Thrie beam or w-beam panel, preferably fabricated of 10 or 12-gauge steel. Plates or tubes may be utilized as well. When a vehicular impact occurs, and the attenuator is compacted, the intermediate diaphragms move successively toward the rear of the crash attenuator 10, by sliding along the rails 16, 18. As this sliding movement of the intermediate diaphragms 28 occurs, the side panels 30 move rearwardly with the intermediate diaphragms to which they are attached, being advantageously designed to nest or double over one another in a sliding pattern. This mechanism will be described in greater detail below.

Figure 4:
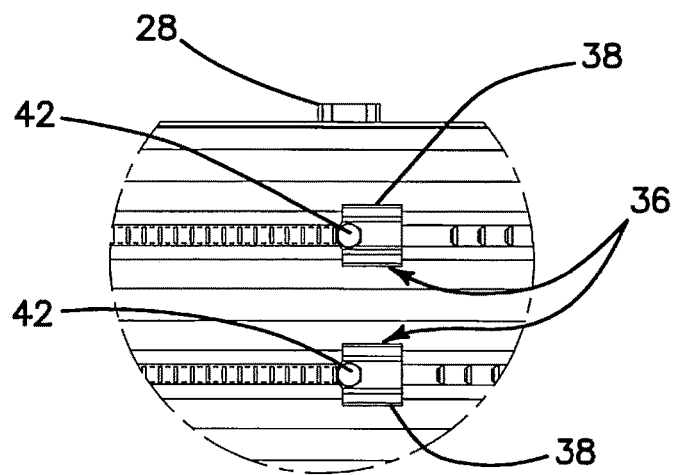
FIG. 4 is a detail view of the portion 4 of FIG. 3.
Figure 4A:
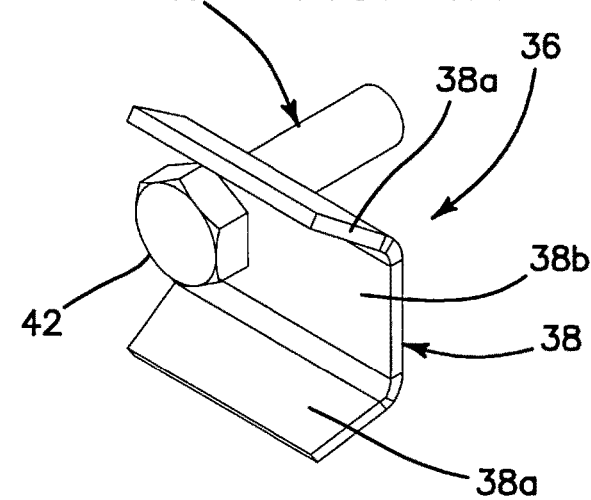
FIGS. 4A-4G are various views of a bent washer plate and bolt assembly shown in FIG. 4.
Figure 4B:
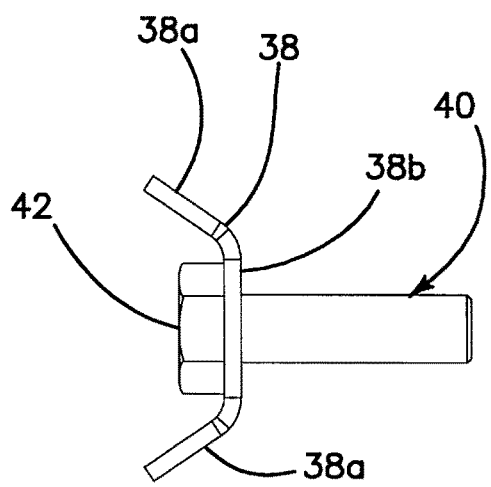
Figure 4C:
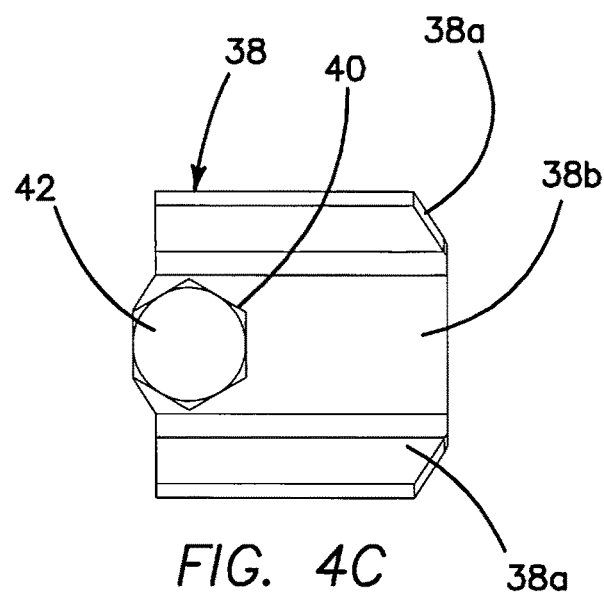
Figure 4D:
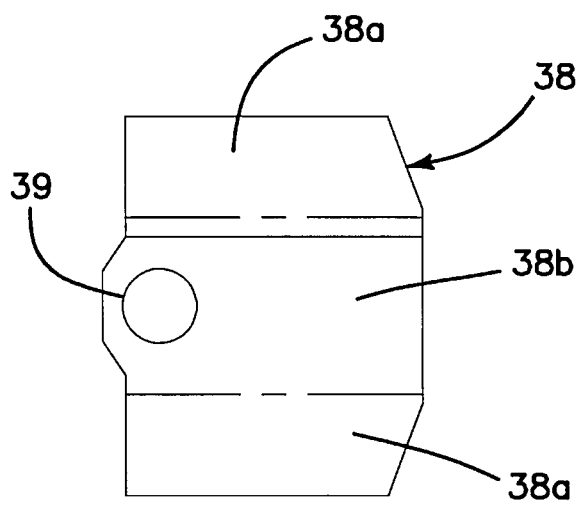
Figure 4E:
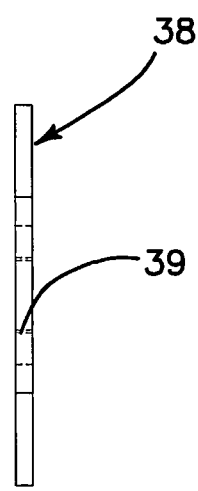
Figure 4F:
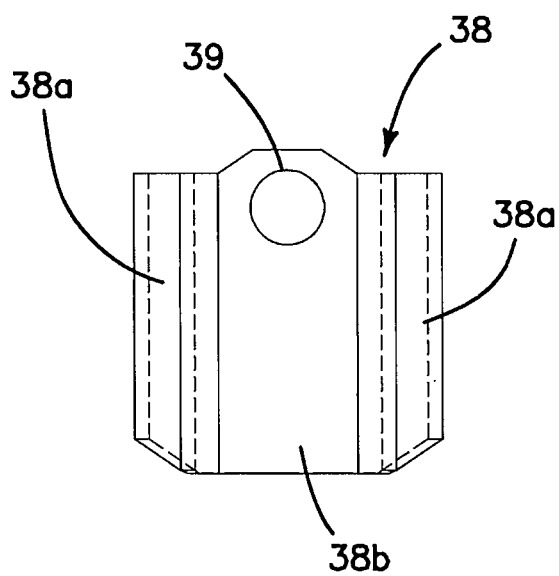
Figure 4G:
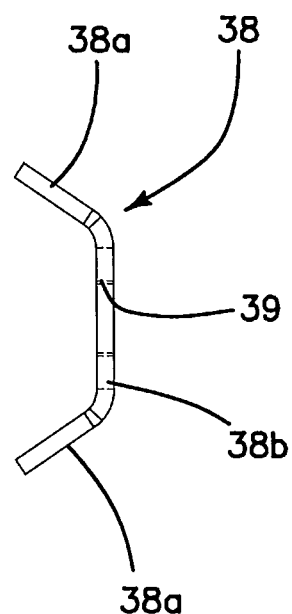
Figure 6:
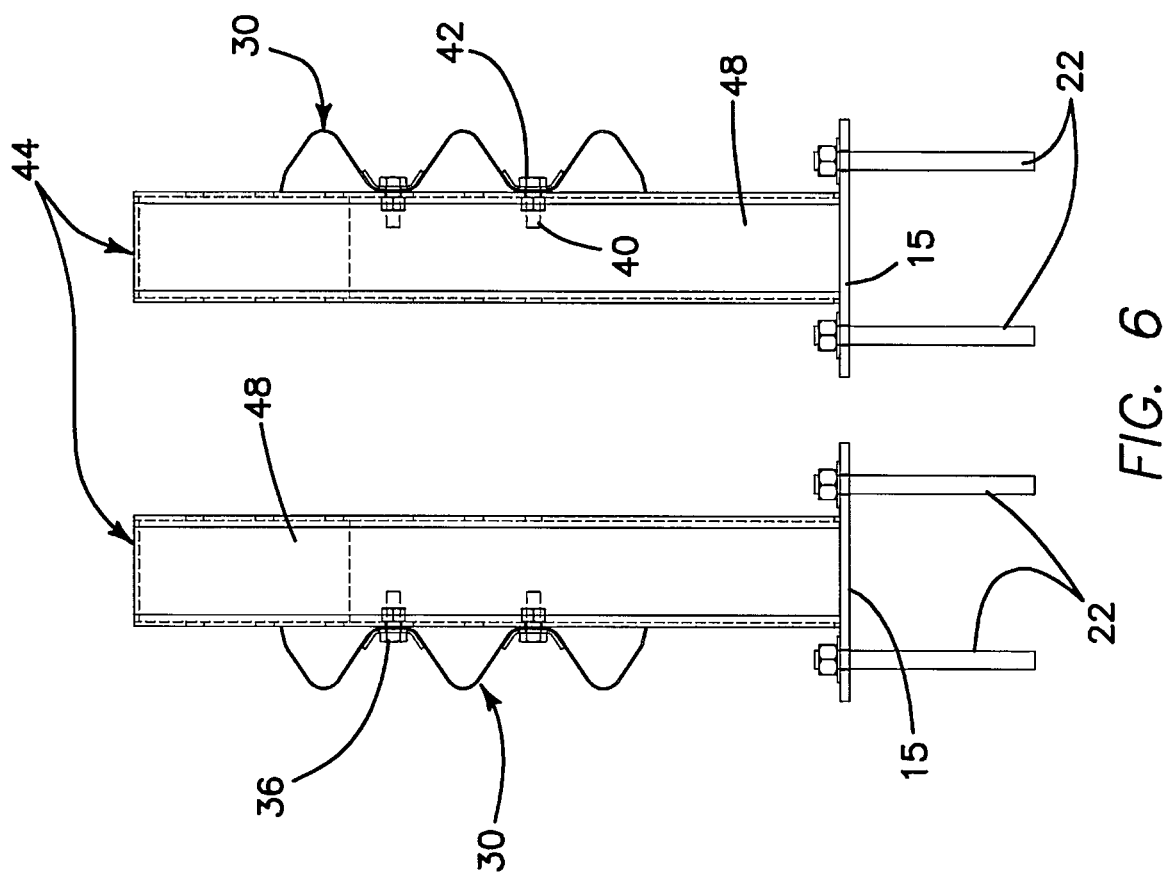
FIG. 6 is a cross-sectional view along lines 6-6 of FIG. 3.
Figure 5:
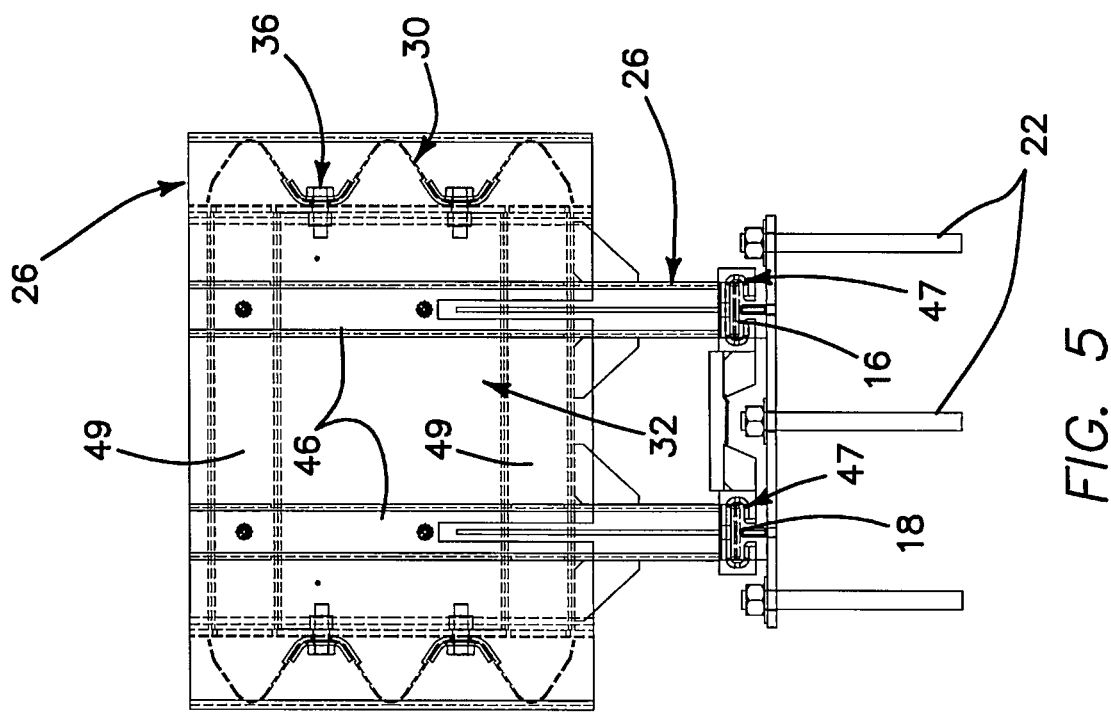
FIG. 5 is a cross-sectional view along lines 5-5 of FIG. 3.

The length of the side panels 30 may be determined by loads in side or oblique impacts, and may be dependent, at least to some extent, on the spacing of the diaphragms. The panels are preferably designed to be common and interchangeable where possible, though only with other panels designed for similar stages of the attenuator system, of course. As shown in FIGS. 4-8, bolt and bent washer plate assemblies 36 secure each side panel 30 to respective intermediate diaphragms 28, as well as securing the adjacent side panel 30 to the impact head 26, or a backup structure assembly 44. Each bolt assembly may comprise a winged bent washer plate 38 secured by a bolt 40, having a bolt head 42. This shaped washer plate configuration has an advantage of controlling the fracture path and panel motion in a more advantageous way. The steel forming the side panels may be galvanized, and may be A36, A513, or A517, for example. FIGS. 4A-4G illustrate, respectively, an isometric view of the bolt and bent washer plate assembly 36, showing the bent washer plate 38 having bent wings 38a and a center portion 38b. Employing flared front wings 38a on the washer plate 38, with forward positioning of the bolt 40, shortens the distance to the shank face, thereby limiting buildup in front of the tearing member (bolt) 40 and under the washer. The shaped washer plates also function to assist in controlling the fracture path and panel motion during the tearing process. FIG. 4B is a profile view of the assembly of FIG. 4A, FIG. 4C is an elevation view, FIG. 4D shows a flat pattern of the bent washer plate 38, FIG. 4E is a flat pattern side view of the bent washer plate as shown in FIG. 4D, FIG. 4F is an elevation view of the bent washer plate 38, and FIG. 4G is a profile view of the bent washer plate 38. The center portion 38b of the bent washer plate 38 includes a hole 39 for receiving the bolt 40.

As shown more particularly in FIGS. 5 and 9-11, the impact head assembly 26 may comprise, in addition to the crushable box 32, upright struts 46, having base ends 47 which are similar to base ends or feet 34 of the intermediate diaphragms 28, though longer, and adapted to slide along the rails 16 and 18.

FIGS. 6 and 15-18B illustrate the backup structure assembly 44, which comprises upright pillars 48 and angled support braces 50 (FIGS. 1-3 and 15-17). The upright pillars 48 and angled support braces 50 comprise the terminal base plates 15, which may be anchored in the ground using bolt anchors 22. It should be noted that the specific structural features of the backup structure assembly 44 may vary in accordance with desired applications, and that, if desired, the crash attenuator 10 may be secured to the fixed structure which is being guarded, using end treatment hardware of known design.

FIGS. 7-8 and 12-14 illustrate the intermediate diaphragms 28, comprising the intermediate diaphragm assembly, in greater detail. The diaphragms 28 comprise upstanding struts 54, at the lower end of which are disposed the base ends or feet 34. The struts 54 are secured together by cross-members 56. As best shown in FIGS. 7 and 8, FIGS. 18-23 illustrate, in particular detail, an exemplary embodiment of the track assembly 12, which comprises the first and second side rails 16, 18, respectively, secured to the longitudinally spaced intermediate base plates 14. On both ends of the crash attenuator 10, the rails 16, 18 extend lengthwise along the larger terminal base plates 15 anchored there for supporting each of the impact head on one end and the backup structure assembly on the second end.

As shown particularly in FIG. 2, an impacting vehicle, in a frontal crash, may impact the nose piece or impact head 26 in a direction from left to right, as denoted by the arrow 58. The system can also attenuate crashes by vehicles impacting from the side or at an angle. The upper attenuator portion is divided into a plurality of stages, for the purpose of tuning and controlling the attenuation properties of the crash cushion 10. In the illustrated exemplary embodiment, the upper attenuator portion 24 comprises a Stage 1 rail assembly 60, a Stage 2 rail assembly 62, a Stage 3 rail assembly 64, a Stage 4 rail assembly 66, and a Stage 5 rail assembly 68, each comprised of a uniquely designed panel, with a smooth transition between panels/stages. The resultant inertia pulse elongation reduces force peaks, thus improving impacting vehicle occupant safety.

The present invention utilizes an energy absorption mechanism employed in the crash attenuator system, which is the designed mode of tearing of elements of the attenuator system as the forces imposed by an impacting vehicle are absorbed. In the illustrated embodiments, the energy absorption method is to tear the side or fenderfende panels 30, using the panel connection hardware, comprised of bolt assemblies 36, as the tearing hardware. Of course, it is within the scope of the invention to utilize other system components as the objects to be torn, and other tearing members, such as an independent washer plate/assembly or other penetrating elements, such as rods, plates, wedges, and the like, as the tearing hardware. The form of the tearing member can be used to dictate the fracture mode and the number of fracture surfaces developed within the base material, as well as control the propagation of the fracture path through the base material. Multiple tearing members may be used in a section of base material to produce additional fracture surfaces and increase force levels and energy dissipation.

Particularly innovative is that the system is designed to be tuned to tear and shear in a controlled manner, in order to maximize impact force attenuation ability and to minimize injury to vehicle occupants to the extent possible, permitting ride-down forces experienced by the vehicle occupants to be substantially below permitted levels under federal crash standards. The means for tuning the tearing levels include, but are not necessarily limited to, adjusting component thicknesses to vary along each stage of the attenuator, utilizing cut-outs in the components to be torn to manage the tearing process, ranging from a component formed of solid material, to a series of holes of various configurations and spacings, such as slots, triangles, including isosceles triangles and equilateral triangles, trapezoids, semi-circles/crescents, perforations, rectangles, and the like. The cut-out sizes can be varied, as well as the spacings between holes, as noted above. A plurality of rows of holes may be employed in each component, wherein the holes are either aligned or staggered with respect to holes in adjacent rows. An objective of this tuning can be to initiate one, two, or three different types of tearing modes, depending upon shape/pattern of the holes and their spacing, as well as component thickness, including Mode 1 (tensile failure), Mode 2 (shear failure), Mode III (out-of-plane shear), and combinations of modes. Control of tearing is designed to result in a consistent and predictable path, created through the planned usage of perforations, pattern spacing, grooves or scoring, and the design of the tearing modality, which in the exemplary embodiment involves an innovative washer plate design used with the bolt assemblies 36, wherein the winged washer 38 has a limited front extension to allow curling of the fender panel and to prevent buildup. Various materials can be used for the components to be torn (e.g. the fender panels 30 in the exemplary embodiment), such as various steels, aluminums, plastics, and FRP (Fiber-Reinforced Plastic). Pattern staggering, as noted above, may be employed to limit force peaks, and tearing can occur through the valley or peak of rails, or anywhere on the panel.

It should be noted, at this juncture, that the terms "tear", "tearing", "tearable", and the like are used herein and in the appended claims as stand-ins for any of the above mentioned terms for creating a lengthwise fracture or slit in a crash attenuator component to attenuate impact energy, and are intended to be broad enough in scope to include any of these terms.

Figure 24:
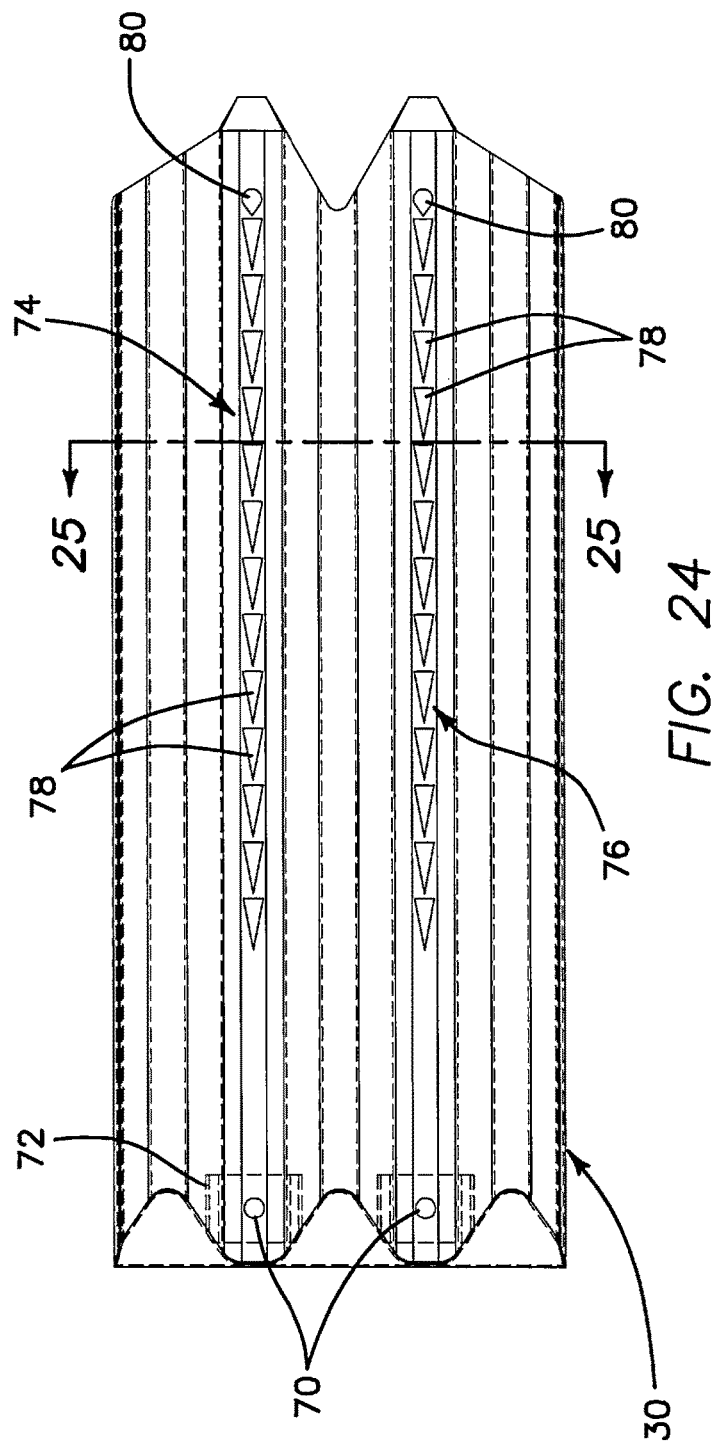
FIG. 24 is an elevational view of an exemplary embodiment of the first stage rail assembly of the present invention.
Figure 25:
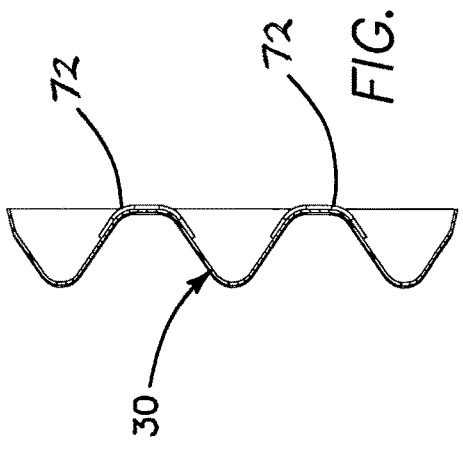
FIG. 25 is a cross-sectional view taken along lines 25-25 of FIG. 24.

With the foregoing in mind, FIGS. 24-25 illustrate an exemplary first stage (Stage 1) of the crash attenuator 10, which is comprised of first fender panels 30, disposed in opposed fashion along both sides of the attenuator system 10, as shown particularly in FIGS. 2 and 3, extending rearwardly from the impact head 26. As illustrated, the panels 30 in Stage 1 include two rows 74, 76 of longitudinally arranged and spaced holes 78, which in this case are shaped as triangles, or more particularly isosceles triangles in particular embodiments. Each row 74, 76 lies in alignment with respective bolt holes 70 for receiving the bolts 40 of the panel bolt assemblies 36. Location 72 accommodates a gusset that is welded to the back of the Thrie beam fender panel 30. This gusset reinforces the panel where the shearing bolt 40 goes through, thereby forcing the downstream bolt to extrude through the panel. The winged washers 38 are welded to respective shearing bolts 40. As shown in FIG. 24, an elongated slot 80, which may also be round, oval, or another shape, is disposed at the rear end of each row 74, 76. The purpose of the slot 80 is to receive the bolt 40 of the bolt assembly securing the front end of the next overlapping panel 30 to the second intermediate diaphragm 28, in the initial deployment state of the crash attenuator 10. The use of slots, teardrops, and other special shapes facilitates stress concentrations at the start of a panel to thereby facilitate initiation of fracture. The first panel is attached to the impact head 26 at the front, spans a first intermediate diaphragm 28, the is bolted to the second intermediate diaphragm 28. On impact by a vehicle exerting impact force in the direction of arrow 58 (FIG. 2), the first panels 30 get accelerated from left to right in the drawing, riding along with the impact head 26 to which they are attached at their respective front ends, so the oval slot 80 is where the tearing bolt 40 will start the tearing process, the bolt moving forwardly relative to the panel until the bolt 40 reaches the front end of the panel 30 on the leftmost end of its respective row 74, 76. Because the tearing action initiated by the bolt 40 in the material of the panel 30 creates a fracture or slit expanding forwardly along the panel, even though the panel is moving rearwardly responsive to the vehicular impact force 58, the rearmost end of the panel is softer than or uniform with the front most end of the panel, as noted above.

Because Stage 1 is the first stage to receive and attenuate the impact force, it is designed to be the softest, with each successive stage being designed to be stiffer than the one before. In stage 1, as noted above, the holes 78 may be triangular, and more particularly isosceles triangles in particular embodiments. Triangular shapes are particularly suited for a single Mode 1 fracture with no debris. During an impact, the tearing bolt 40 moves through the panel 30 from right to left opposite the direction of the panel, as noted above. As the tearing bolt 40 moves into the triangular hole 78, the bolt hits the two diverging sides of the triangle, creating a tensile load at the left point of the triangle. As noted above, this starts a Mode 1 tensile failure in the material ahead of the tear bolt, and occasionally, Mode II shearing will also be present, particularly at the beginning of the tearing process.

Figure 26:
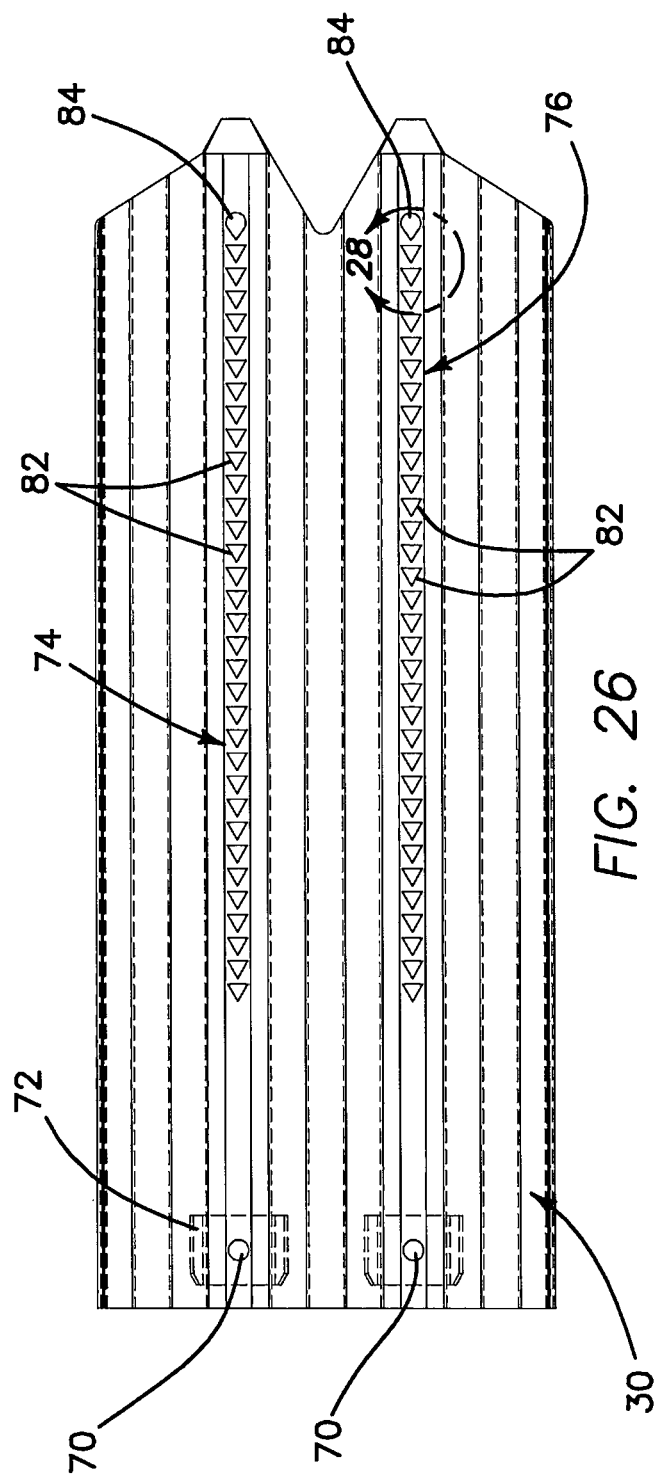
FIG. 26 is an elevational view of an exemplary embodiment of the second stage rail assembly of the present invention.
Figure 28:
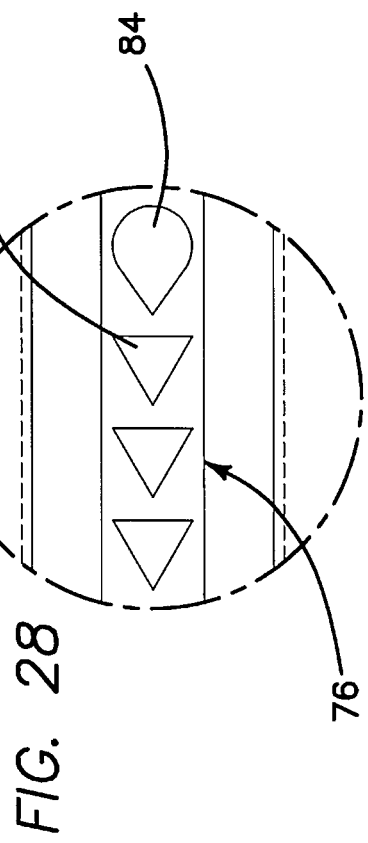
FIG. 28 is an elevational view of the portion of FIG. 26 denoted by the numeral 28.
Figure 27:
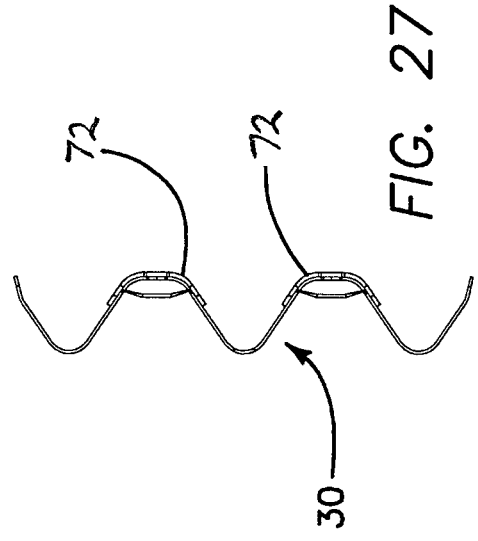
FIG. 27 is a profile view of the second stage rail assembly shown in FIG. 26.

As noted above, Stage 2, illustrated in FIGS. 26-28, is the next stage, and next fender panel 30 to be impacted. It is designed to be stiffer than Stage 1, but still relatively soft, since impact forces are still quite high, after attenuation only by the impact head and the Stage 1 panels. In Stage 2, the panel 30 has two rows 74, 76, along the same location as in Stage 1, of holes 82. These holes 82 are also illustrated as triangular, but of a smaller nature than the holes of Stage 1, and more closely spaced. The triangles may be isosceles triangles, or, as illustrated, equilateral triangles, but may also be of alternate shapes, such as round, trapezoidal, rectangular, and the like. In the illustrated embodiment, there are thirty-three holes 82 along a 32-inch length of each of the rows 74, 76. Of course, this is merely an exemplary number, as the actual number of holes and spacing between them can vary, depending upon design considerations. Larger elongated holes 84 are disposed on the downstream (right-most) end of each row 74, 76, for accommodating the bolt 40 securing the panel 30 to the corresponding intermediate diaphragm 28. As the impact force continues, the panel 30 moves rightwardly, causing the tearing bolts 40 to move (in a relative sense) leftwardly (frontally) along their respective rows 74, 76.

The next panel 30 comprises Stage 3, as shown in FIGS. 29-31. This stage appears similar to stage 2, in that the shape of the holes is the same, but in this exemplary embodiment, there are twenty-nine holes 85 along a 31½ inch length of each of the rows 74, 76. Thus, the stage 3 panel 30 is "stiffer" than the stage 2 panel 30, because of the fewer, more widely spaced holes 85 compared to the holes 82 of the Stage 2 panel.

Stages 4 and 5 are illustrated in FIGS. 32-35, wherein the fourth and fifth stage fender panels 30 also have two rows of holes 74, 76. In the illustrated embodiment, the same panels 30 are used for both Stages 4 and 5, and the panel utilizes trapezoidal holes 86. Circular holes 90 function to initiate the tearing in this stage. It should be noted that in Stages 4 and 5, the relative axial locations of the trapezoidal holes 86 in each row 74 and 76 are staggered, rather than being aligned. The purpose of this staggering is to create a more even force attenuation, smoothing the peaks and valleys of the force deflection curve. Trapezoids are well suited for dual Mode II/Mode III fracture.

If desired, later stage panels 30 may be comprised of a thicker material than earlier stages, in order to further stiffen the later stages relative to the earlier ones.

As noted above, the illustrated embodiment is exemplary only, and different numbers of rows of holes, differing shapes of holes, different spacings, staggerings and the like, may be employed to create desired attenuation characteristics. One alternative exemplary embodiment, for example, utilizes isosceles triangles in Stage 1, equilateral triangles in Stages 2 and 3, of various sizes and spacings, and trapezoids in Stages 4 and 5, also of various sizes and spacings. Rectangles, with or without perforations, may be utilized for dual Mode II/Mode III fracture. It should also be noted that, while the exemplary embodiment primarily comprises stages which correlate to panel transitions, it is well within the scope of the invention to divide a single panel into a plurality of stages, by changing material thickness, holes sizes, hole spacing or other characteristics as described herein within the confines of a single panel rather than after transition from one panel to the next panel.

Advantageously, the invention contemplates utilizing multiple fracture surfaces in a single panel, longitudinal staggering of fracture modification patterns, and alternative spacing of shaped holes within a panel segment. It is particularly noted that the modification (holes) patterns on each of the panels, as illustrated, terminate early, before the end of the panel and the plate 72 and prior to full-stroke, in order to increase forces to bottom out the current panel and smoothly transition to an initiation of fracture in the subsequent panel while reducing inertial forces.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A crash impact attenuator system for mitigating a direct vehicular impact with a structure, the system comprising:
    an attenuator portion comprising a rail extending along a length of the crash impact attenuator system and a plurality of diaphragms initially disposed in spaced relation along the length of the rail, each of the plurality of diaphragms having a base end or foot adapted to be movably engaged with the rail, so that when the crash impact attenuator system receives an impact force from an impacting vehicle, a first one of the plurality of diaphragms moves rearwardly along the rail and impacts a second one of the plurality of diaphragms, wherein both the first and second ones of the plurality of diaphragms move further rearwardly along the rail, this process continuing with additional ones of the plurality of diaphragms until the impact forces have been fully attenuated;
    the attenuator portion further including a plurality of side panels disposed along a side of the attenuator portion;
    the plurality of side panels being adapted to slide rearwardly along the attenuator portion when the crash impact attenuator system is impacted by a vehicle, so that a first one of the plurality of side panels slides over a second one of the plurality of side panels as it the first one of the plurality of side panels slides rearwardly responsive to a vehicular impact, each of the plurality of side panels including a plurality of holes disposed in material comprising each of the plurality of side panels, the plurality of holes extending along a length of each of the plurality of side panels and being spaced lengthwise from one another; and
    a tearing member disposed on the attenuator portion which is adapted to engage one of the plurality of holes in the material forming the first one of the plurality of side panels, wherein when the crash attenuator system is impacted by a vehicle, relative motion occurs between the first one of the plurality of side panels and the tearing member, thereby tearing a fracture or slit in the material forming the first one of the plurality of side panels which extends between adjacent ones of the plurality of holes, the tearing of the side panel material attenuating the impact force, the side panel material being tuned to optimize the tearing of the side panel material;
    wherein the first one of the plurality of side panels comprises a first stage attenuator portion and a second stage attenuator portion is disposed on either a rearward portion of the first one of the plurality of side panels or on the second one of the plurality of side panels, the first stage attenuator portion being forward of the second stage attenuator portion, the plurality of holes disposed in the first stage attenuator portion being configured and tuned to have a first shape, pattern, and/or spacing between holes to trigger a Mode I tensile failure, and a plurality of holes disposed in the second stage attenuator portion being configured and tuned to have a second shape, pattern, and/or spacing between holes different than the first shape, pattern, and/or spacing between holes to trigger a Mode II shearing failure.

2. The crash impact attenuator system as recited in claim 1, wherein the first stage attenuator portion is softer than the second stage attenuator portion.

3. The crash impact attenuator system as recited in claim 1, wherein the tearing member comprises a bolt.

4. The crash impact attenuator system as recited in claim 3, wherein the bolt is assembled together with a bent washer plate.

5. The crash impact attenuator system as recited in claim 4, wherein the bent washer plate comprises a flared front wing.

6. The crash impact attenuator system as recited in claim 4, wherein the bent washer plate has a limited front extension to allow curling of the one of the plurality of side panels with which the bent washer plate is engaged, and to prevent buildup as the one of the plurality of side panels is being torn by the bolt.

7. The crash impact attenuator system as recited in claim 1, wherein the tearing member is disposed on one of the plurality of diaphragms.

8. The crash impact attenuator system as recited in claim 1, wherein the tearing member comprises a plurality of tearing members.

9. The crash impact attenuator system as recited in claim 1, wherein the plurality of holes are arranged to form first and second rows of holes spaced from one another along a height of the side panel in which they are disposed.

10. The crash impact attenuator system as recited in claim 9, wherein corresponding ones of the holes forming each of the first and second rows of holes on the side panel in which they are disposed are aligned lengthwise with one another.

11. The crash impact attenuator system as recited in claim 9, wherein corresponding ones of the holes forming each of the first and second rows of holes on the side panel in which they are disposed are staggered lengthwise from one another.

12. The crash impact attenuator system as recited in claim 1, wherein the first stage attenuator portion is configured and tuned so that the plurality holes in the first stage attenuator portion have the first shape comprising a triangle and the second stage attenuator portion is configured and tuned so that the plurality of holes in the second stage attenuator portion have a second shape comprising a trapezoid.

13. The crash impact attenuator system as recited in claim 1, and further comprising a third stage attenuator portion, a fourth stage attenuator portion, and a fifth stage attenuator portion extending lengthwise rearwardly of the second stage attenuator portion.

14. The crash impact attenuator system as recited in claim 1, and further comprising a nose box disposed at the frontmost end of the crash attenuator system.

15. The crash impact attenuator system as recited in claim 1, wherein the plurality of holes extending along the length of each of the plurality of side panels, and being spaced lengthwise from one another, comprise a row of holes on each of the plurality of side panels, the row of holes extending lengthwise along each of the plurality of side panels terminating before reaching a front end of each of the plurality of side panels, wherein termination of the row of holes in each of the plurality of side panels facilitates initiation of tearing in a next adjacent one of the plurality of side panels, thereby reducing spikes in attenuation of the impact force as the crash impact attenuator system is compressed.

16. The crash impact attenuator system as recited in claim 1, wherein the rail comprises first and second rails disposed in parallel to one another and extending along a length of the attenuator portion, each of the first and second rails having a T-shaped configuration, including a top flange disposed horizontally and extending along a length of each rail, and further wherein the base end or foot of each of the plurality of diaphragms comprises first and second base ends or feet, the first foot being configured to wrap around the top flange of the first rail and the second foot being configured to wrap around the top flange of the second rail, so that lateral loads from oblique impacts to the crash impact attenuator system are distributed to each of the first and second rails.

17. A crash impact attenuator system for mitigating a direct vehicular impact with a structure, the system comprising:
   an attenuator portion comprising a rail extending along a length of the crash impact attenuator system and a plurality of diaphragms initially disposed in spaced relation along the length of the rail, each of the plurality of diaphragms having a base end or foot adapted to be movably engaged with the rail, so that when the crash impact attenuator system receives an impact force from an impacting vehicle, a first one of the plurality of diaphragms moves rearwardly along the rail and impacts a second one of the plurality of diaphragms, wherein both the first and second ones of the plurality of diaphragms move further rearwardly along the rail, this process continuing with additional ones of the plurality of diaphragms until the impact forces have been fully attenuated;
   the attenuator portion further including a plurality of side panels disposed along a side of the attenuator portion;
   the plurality of side panels being adapted to slide rearwardly along the attenuator portion when the crash impact attenuator system is impacted by a vehicle, so that a first one of the plurality of side panels slides over a second one of the plurality of side panels as the first one of the plurality of side panels slides rearwardly responsive to a vehicular impact, each of the plurality of side panels including a plurality of holes disposed in material comprising each of the plurality of side panels, the plurality of holes extending along a length of each of the plurality of side panels and being spaced lengthwise from one another; and
   a tearing member disposed on the attenuator portion which is adapted to engage one of the plurality of holes in the material forming the first one of the plurality of side panels, wherein when the crash attenuator system is impacted by a vehicle, relative motion occurs between the first one of the plurality of side panels and the tearing member, thereby tearing a fracture or slit in the material forming the first one of the plurality of side panels which extends between adjacent ones of the plurality of holes, the tearing of the side panel material attenuating the impact force, the side panel material being tuned to optimize the tearing of the side panel material;
   wherein the tearing member comprises a bolt is assembled together with a bent washer plate.

18. The crash impact attenuator system as recited in claim 17, wherein the bent washer plate comprises a flared front wing.

19. The crash impact attenuator system as recited in claim 18, wherein the bent washer plate has a limited front extension to allow curling of the one of the plurality of side panels with which the bent washer plate is engaged, and to prevent buildup as the one of the plurality of side panels is being torn by the bolt.

* * * * *